(12) United States Patent
Fan et al.

(10) Patent No.: US 6,389,019 B1
(45) Date of Patent: May 14, 2002

(54) TIME-BASED SCHEDULER ARCHITECTURE AND METHOD FOR ATM NETWORKS

(75) Inventors: Ruixue Fan, Plainsboro; Brian L. Mark, Princeton; Gopalakrishan Ramamurthy, Cranbury; Alexander T. Ishii, Princeton, all of NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/040,311

(22) Filed: Mar. 18, 1998

(51) Int. Cl.[7] .............................................. H04L 12/56
(52) U.S. Cl. ...................................... 370/395; 370/233
(58) Field of Search ................................ 370/230, 352, 370/257, 419, 389, 440, 432, 397, 395, 232, 229, 231–237, 241, 251–254, 387, 337, 447, 445, 442, 400, 412, 413, 428, 418, 351; 395/200.3

(56) References Cited

U.S. PATENT DOCUMENTS

| | | | | |
|---|---|---|---|---|
| 5,706,288 A | * | 1/1998 | Radhakrishnan et al. ... | 370/418 |
| 5,719,853 A | * | 2/1998 | Ikeda ......................... | 370/229 |
| 5,751,709 A | | 5/1998 | Rathnavelu | |
| 5,774,653 A | * | 6/1998 | Katevenis ................. | 395/200.3 |
| 5,838,677 A | * | 11/1998 | Kozaki et al. .............. | 370/389 |
| 5,850,395 A | * | 12/1998 | Hauser et al. .............. | 370/398 |
| 5,864,540 A | * | 1/1999 | Bonomi et al. ............. | 370/235 |
| 5,889,779 A | * | 3/1999 | Lincoln ....................... | 370/398 |
| 5,892,762 A | | 4/1999 | Okuda et al. | |
| 5,909,443 A | * | 6/1999 | Fichou et al. ............... | 370/412 |
| 6,005,866 A | * | 12/1999 | Linoln ......................... | 370/398 |
| 6,011,775 A | * | 1/2000 | Bonomi et al. ............. | 370/230 |
| 6,028,843 A | * | 2/2000 | Delp et al. .................. | 370/235 |
| 6,226,265 B1 | * | 5/2001 | Nakamichi et al. ......... | 370/235 |

FOREIGN PATENT DOCUMENTS

| | | |
|---|---|---|
| JP | 9-36912 | 2/1997 |
| JP | 9-200231 | 7/1997 |
| WO | WO 97/14240 | 4/1997 |

OTHER PUBLICATIONS

Yoshihiro Ohba, "QLWFQ: A Queue Length Based Weighted Fair Queueing Algorithm in ATM Networks," IEEE, Apr. 7, 1997, pp. 566–575.

Jennifer Rexford, et al., "A Scalable Architecture for Fair Leaky–Bucket Shaping," IEEE Infocom '97, Proceedings vol. 3, pp. 1054–1062.

* cited by examiner

*Primary Examiner*—Dang Ton
(74) *Attorney, Agent, or Firm*—Sughrue Mion, PLLC

(57) ABSTRACT

A flexible and scalable architecture and method that implements dynamic rate control scheduling in an ATM switch. The scheduler shapes a large number of streams according to rate values computed dynamically based on switch congestion information. To handle a large range of bit rates, a plurality of timewheels are employed with different time granularities. The streams are assigned dynamically to the timewheels based on computed rate values. The shaper architecture and method support priority levels for arbitrating among streams which are simultaneously eligible to transmit.

30 Claims, 17 Drawing Sheets

CELL ARRIVAL TIMESTAMP COMPUTATION

PROCEDURE FOR SETTING IDLE BIT

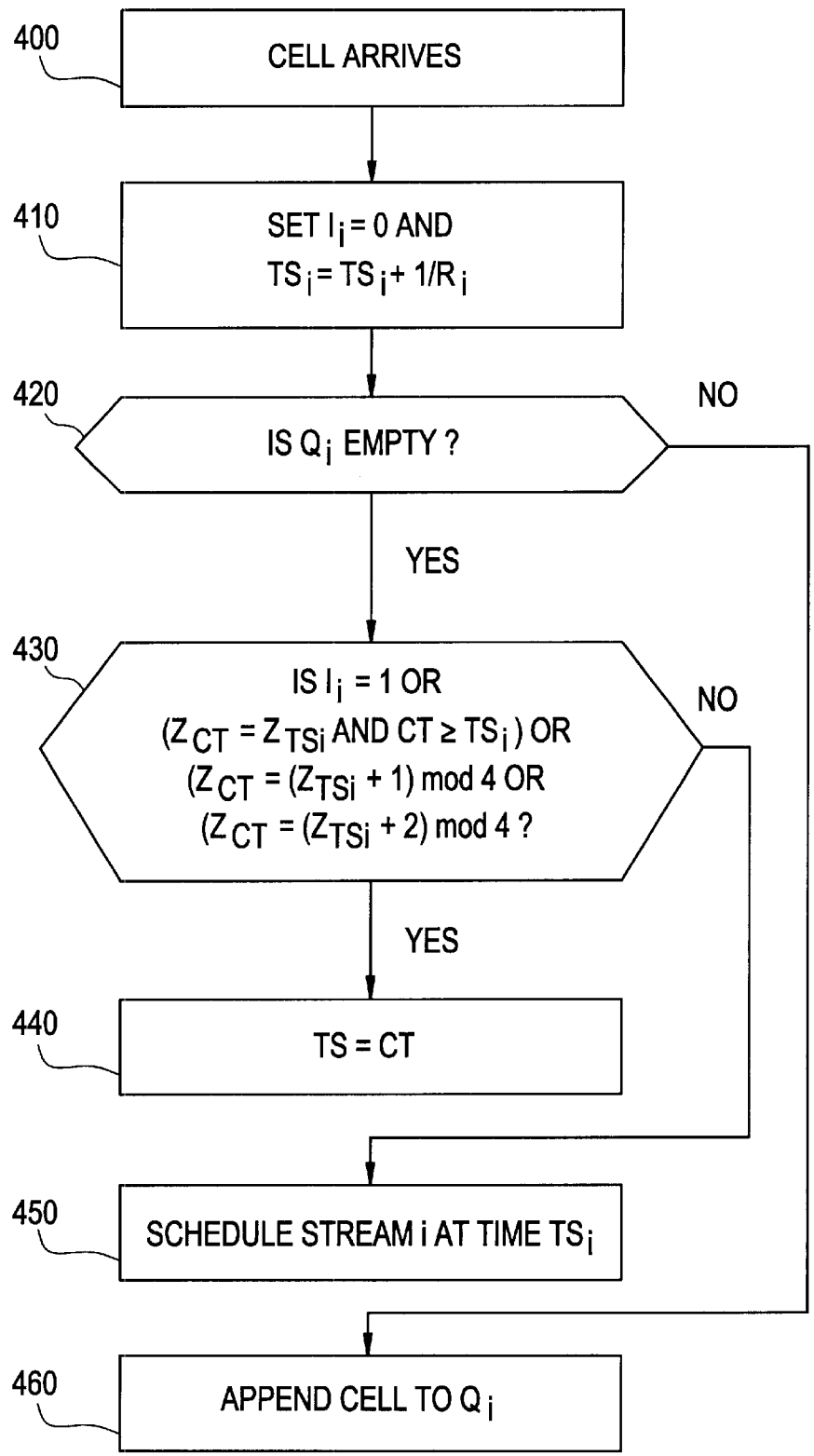

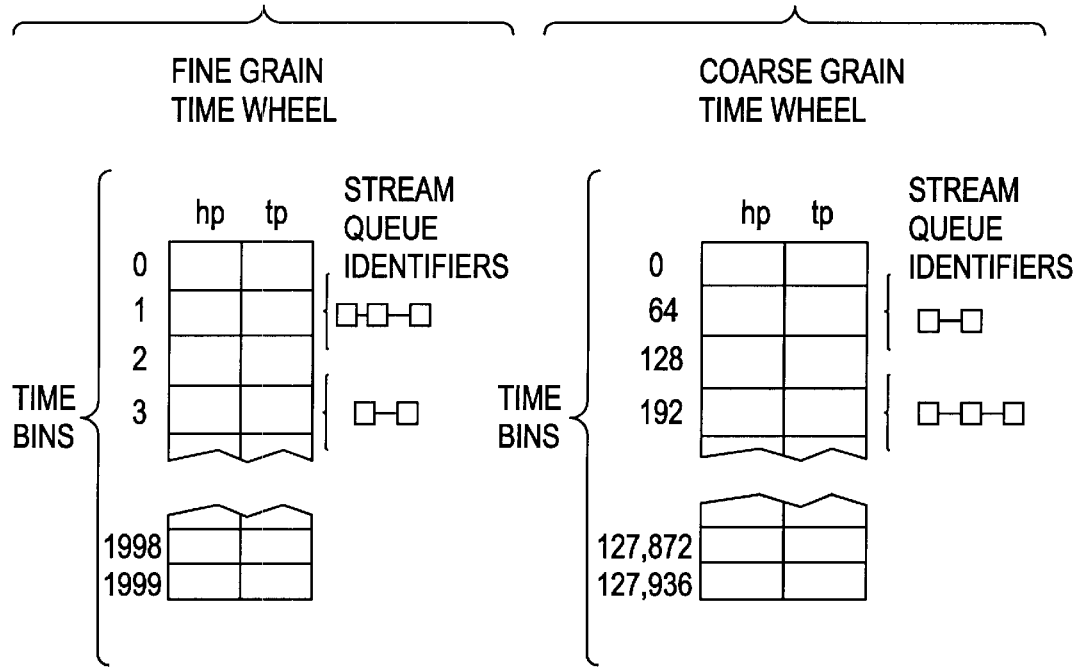
FIG. 8 FINE GRAIN TIME WHEEL
FIG. 9 COARSE GRAIN TIME WHEEL
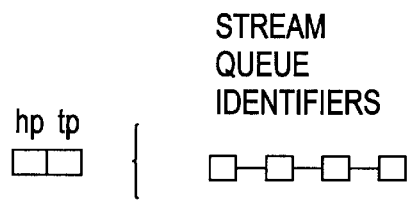
FIG. 10 READY LIST

FIG. 11
FIG. 12
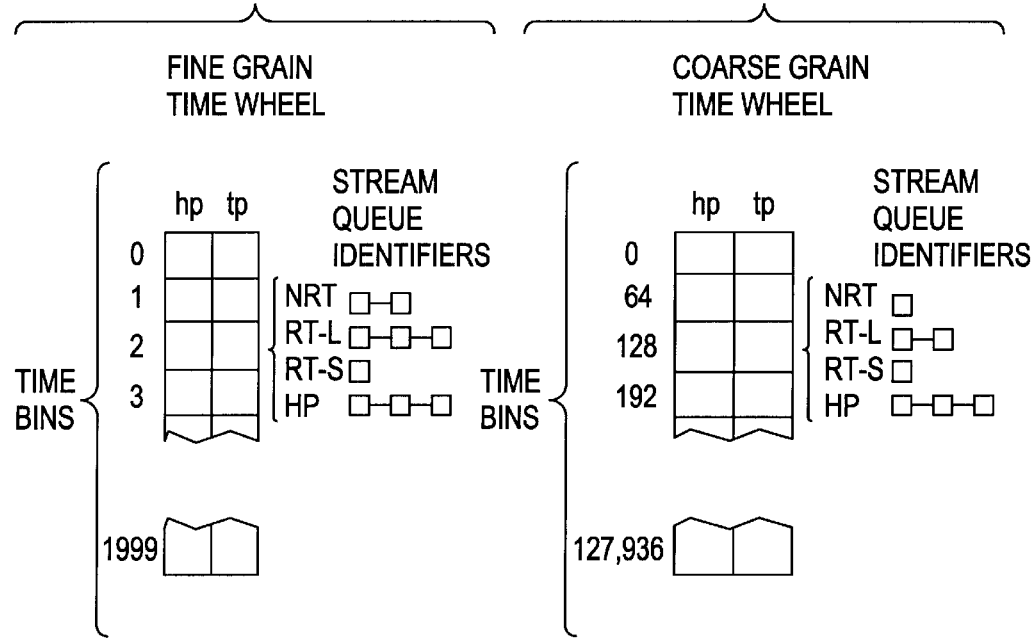
FIG. 13
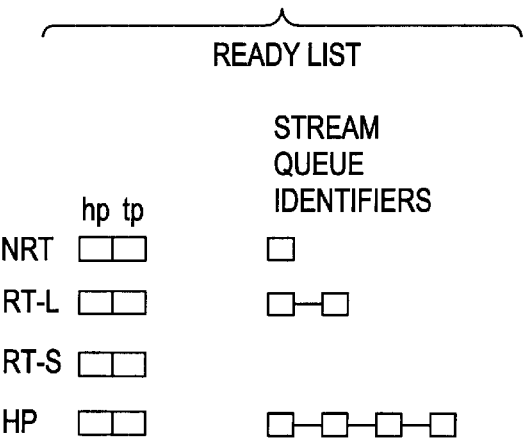

FIG. 14

PROCEDURE FOR ATTACHING
A STREAM QUEUE IDENTIFIER
TO A READY LIST if = CT = 0 mod 64, then X = C; t = CT/64 else

X = F; t = CT mod 2K end if rc = rc + $M_X[t]$;

for i = 0 to 3 do if $B_X[i][t]$ = 1, then tp = $T_X[i][t]$.tp; hp = $T_X[i][t]$.hp if r[i].hp = 0, then r[i].hp = hp; r[i].tp = tp else v[ r[i].tp ] = hp; r[i].tp = tp end if $B_X[i][t]$ = 0 end if end for

FIG. 15

PROCEDURE FOR INSERTING A STREAM QUEUE IDENTIFIER if ($Z_{TS} = Z_{CT}$ and TS < CT) or ($Z_{TS} \neq Z_{CT} + 1$) then
    if CT = 0 mod 64, then
        X = C; t = CT/64;
    else
        X = F; t = CT mod 2K;
    end if
else
    if $Z_{TS} = Z_{CT}$, then
        if TS - CT < 2K, then
            t = TS mod 2K; X = F
        else
            t = TS/64; X = C
        end if
    else
        if 128K - (CT - TS) and (TS mod 64 $\neq$ 0), then
            X = F; t = TS mod 2K;
        else
            X = C; t = TS/64
        end if
    end if if $B_X[i][t] = 0$, then
    $B_X[i][t] = 1$;
    $M_X[t] = 1$;
    $T_X[i][t].hp$ = stream queue identifier;
    $T_X[i][t].tp$ = stream queue identifier;
else
    tp = $T_X[i][t].tp$
    $M_X[t] = M_X[t] + 1$;
    $T_X[i][t].tp$ = stream queue identifier
    V[ tp ] = stream queue identifier end if

FIG. 16

PROCEDURE FOR EXTRACTING A STREAM QUEUE
IDENTIFIER FROM A READY LIST

```
for i = 0 to 3, do
    while (sufficient time in cell slot) and
    (r[ i ].hp ≠ 0), then
        if r[ i ].hp = r[ i ].tp, then
            q = r[ i ].hp
            r[ i ].hp = 0
        else
            q = r[ i ].hp
            r[ i ].hp = V[ e ]
        end if
        rc = rc - 1;
        Pass q on to another process to serve the
        queue
    end while
end for
```

FIG. 17 CELL ARRIVAL TIMESTAMP COMPUTATION COMBINING SCHEDULING AND UPC SHAPING

CELL DEPARTURE TIMESTAMP COMPUTATION
CONTAINING SCHEDULING AND UPC SHAPING

FIG. 19
Fine Grain Time Wheel

Number of priority levels L = 4
Granularity of coarse wheel G = 64

| | |
|---|---|
| 0 | P = 0 |
| 1 | P = 1 |
| 2 | P = 2 |
| 3 | P = 3 |
| 4 | P = 0 |
| 5 | P = 1 |
| 6 | P = 2 |
| 7 | P = 3 |
| ⋮ | ⋮ |
| M*(L-1) | P = 0 |
| M*L - 3 | P = 1 |
| M*L - 2 | P = 2 |
| M*L - 1 | P = 3 |

Time Range: 0 to M*L - 1
Length: M*L

FIG. 20
Coarse Grain Time Wheel

Number of priority levels L = 4
Granularity of coarse wheel G = 64

| | |
|---|---|
| 0 | P = 0 |
| 64 | P = 1 |
| 128 | P = 2 |
| 192 | P = 3 |
| 256 | P = 0 |
| 320 | P = 1 |
| 384 | P = 2 |
| 448 | P = 3 |
| G*(N*L-4) | P = 0 |
| G*(N*L-3) | P = 1 |
| G*(N*L-2) | P = 2 |
| G*(N*L-1) | P = 3 |

Priority level P

Time Range: 0 to G*(N*L - 1)
Length: N*L

FIG. 21

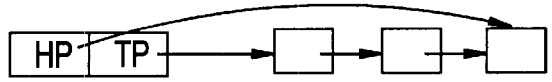

Each timewheel time-bin consists of a list of stream queue identifiers

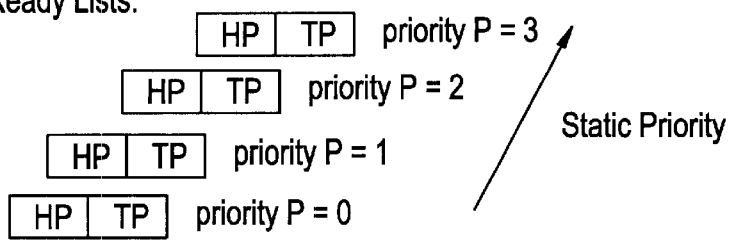

Ready Lists:

| HP | TP | priority P = 3 |
| HP | TP | priority P = 2 |
| HP | TP | priority P = 1 |
| HP | TP | priority P = 0 |

Static Priority

Timewheel scheduling operations

Timewheel scheduling operations (continued)

TIME-BASED SCHEDULER ARCHITECTURE AND METHOD FOR ATM NETWORKS

This application relates to U.S. application Ser. No. 08/924,820 filed on Sep. 5, 1997 entitled, "Dynamic Rate Control Scheduler for ATM Networks," and Ser. No. 08/923,978, now U.S. Pat. No. 6,324,165, filed on Sep. 5, 1997 entitled, "Large Capacity, Multiclass Core ATM Switch Architecture," both of which are assigned to the Assignee of the present invention and which are incorporated herein by reference.

BACKGROUND OF THE INVENTION

1. Field of the Invention

This invention relates to schedulers for asynchronous transfer mode (ATM) networks and, more specifically, to an architecture and method for scheduling stream queues serving cells with different quality-of-service (QoS) requirements while shaping the transmission rate to avoid congestion at bottlenecks within an ATM switch.

2. Description of Related Art

The function of a scheduler is to determine the order in which cells queued at a port are to be sent out. The simplest scheduling method is a first-in, first-out (FIFO) method. Cells are buffered in a common queue and sent out in the order in which they are received. The problem with FIFO queuing is that there is no isolation between connections or even between traffic classes. A "badly behaving" connection (i.e., it sends cells at a much higher rate than its declared rate) may adversely affect quality of service (QoS) of other "well behaved" connections.

A solution to this problem is to queue cells in separate buffers according to class. One further step is to queue cells on a per connection basis. The function of the scheduler is to decide the order in which cells in the multiple queues should be served. In round-robin (RR) scheduling, the queues are visited in cyclic order and a single cell is served when a visited queue is not empty. However, if all queues are backlogged, the bandwidth is divided equally among the queues. This may not be desirable, however, because queues may be allocated different portions of the common link bandwidth.

In weighted round-robin (WRR) scheduling, which was described in a paper by Manolis Katevenis, et al., entitled, "Weighted Round-Robin Cell Multiplexing in a General Purpose ATM Switch Chip," IEEE Journal on Selected Areas in Communications, Vol. 9, No. 8, pp. 1265–1279, October 1991, each queue (connection or class queue) is assigned a weight. WRR aims to serve the backlogged queues in proportion to the assigned weights. WRR is implemented using counters, one for each queue. The counters are initialized with the assigned weights. A queue is eligible to be served if it is not empty and has a positive counter value. Whenever a queue is served, its counter is decreased by one (to a minimum of zero). Counters are reset with the initial weights when all other queues are either empty or have zero counter value. One problem with this counter-based approach is that the rate granularity depends on the choice of frame size (i.e., the sum of weights).

Another method, weighted fair queuing (WFQ), also known as packet-by-packet generalized sharing (PGPS), was described in a paper by Alan Demers, et al., entitled, "Analysis and Simulation of a Fair Queuing Algorithm," Proc. SIGCOMM'89, pp. 1–12, Austin, Tex., September 1989, and a paper by S. Jamaloddin Golestani, entitled, "A Self-clocked Fair Queuing Scheme for Broadband Applications," IEEE, 0743-166X/94, 1994, pp. 5c.1.1–5c.1.11. This method is a scheduling algorithm based on approximating generalized processor sharing (GPS). In the GPS model, the traffic is assumed to be a fluid, such that the server can drain fluid from all queues simultaneously at rates proportional to their assigned weights. A timestamp is computed when each cell arrives. The value of the timestamp represents the finishing time of the cell in the fluid model. The WFQ method schedules by selecting the cell with the smallest timestamp value.

All the methods described above are work-conserving with respect to the local link bottleneck, in the sense that if there are cells in the buffer(s), one cell will be served during a cell time. In contrast, another cell scheduling scheme, dynamic rate control (DRC), which was developed in co-pending application Ser. No. 08/924,820, is in general, non-work conserving. A cell may be held back if it could cause congestion downstream. DRC scheduling uses timestamps, as in WFQ, but the timestamps represent absolute time values. Thus, DRC may hold back a cell, if necessary, to alleviate congestion at a later switch bottleneck. This feature cannot be achieved with WFQ or WRR. One feature of DRC is that it does not require sorting of the timestamps, since the timestamps are compared to an absolute time clock. Also, traffic shaping can easily be incorporated into the DRC scheduler.

SUMMARY OF THE INVENTION

The present invention is a flexible and scalable architecture and method that implements DRC scheduling. Details on the algorithms and principles underlying DRC scheduling, are described in co-pending application Ser. No. 08/924,820. A key component of the DRC scheduler is a traffic shaper that shapes multiple traffic streams based on dynamically computed rates. The rates are computed based on congestion information observed at switch bottlenecks. Alternatively, the rates can be computed based only on the congestion observed at the local bottleneck. The modular design of the scheduler allows it to be used in a variety of switch configurations. In particular, the DRC scheduler architecture and method of the present invention can be applied to the input-output buffered switch architecture discussed in co-pending application Ser. No. 08/923,978 now U.S. Pat. No. 6,324,165.

The traffic shaper can shape a large number of streams with a wide range of associated rate values. With current technology, the architecture is able to support per VC queuing with up to 64 K virtual channels (VCs) with bit rates ranging from 4 Kbps to 622 Mbps. Scalability with respect to the number of streams that can be supported is achieved by scheduling streams to be served using a timewheel data structure, also known as a calendar queue. Calendar queues are well known. See for example, an article by R. Brown entitled, "Calendar Queues: A Fast 0(1) Priority Queue Implementation for the Simulation Event Set Problem," Communications of the ACM, Vol. Oct. 31, 1988, which is incorporated herein by reference.

To handle a large range of bit rates, a plurality of timewheels are employed with different time granularities. The timewheel concept and the partitioning of rates into ranges are also well known. See for example, an article by J. Rexford, et al. entitled, "Scalable Architecture for Traffic Shaping in High Speed Networks, IEEE INFOCOM '97, (Kobe), April 1997, which is incorporated herein by reference. The shaper architecture of the present invention differs from the one described in the Rexford article in that it supports priority levels for arbitrating among streams which are simultaneously eligible to transmit. The highest priority level is assigned dynamically to provide short time-scale minimum rate guarantees in DRC scheduling. The remaining priority levels provide coarse QoS differentiation for defining traffic classes. Also in this architecture, the assignment of streams to timewheels is dynamic, depending on the current rate value computed for the stream.

A primary object of the invention is to provide an architecture and method capable of scheduling stream queues serving cells with different QoS requirements while shaping the transmission rate to avoid congestion at bottlenecks in an ATM switch.

Another object of the invention is to provide a scheduler architecture that can be used to implement available bit rate (ABR) service virtual source (VS)/virtual destination (VD) protocols as outlined in "Traffic Management Specification, Version 4.0," The ATM Forum, March 1996).

Another object of the invention is to provide a scheduler architecture that performs both scheduling and dual leaky bucket usage parameter control (UPC) shaping as also outlined in "Traffic Management Specification, Version 4.0." UPC shaping is used to force a traffic stream to conform to UPC parameters in order to avoid cell tagging or discarding at the interface to another subnetwork through which the stream passes.

Herein, the principles of the present invention will be schematically described in consideration of the above to facilitate the present invention.

Briefly, the gist of the present invention resides in the fact that a dynamic rate is calculated in consideration of congestion information on a downstream side and a timestamp is calculated on the basis of the dynamic rate to schedule/reschedule a queue. More specifically, when the timestamp is denoted by TS, a timestamp for scheduling is given by max(TS+1/R, CT) while a timestamp for rescheduling is given by TS=TS+1/R where CT is a current time and R is the dynamic rate. Herein, it is to be noted that the dynamic rate R is calculated by R=M+wE where M and w are representative of a minimum guaranteed rate and a weight factor, respectively, and E is representative of an excess rate calculated on the basis of congestion information.

As readily understood from the above, the dynamic rate R depends on the excess rate E and is successively updated. In addition, the timestamps for scheduling/rescheduling are determined by the use of the most recently computed value of the dynamic rate R. This shows that the timestamps for scheduling/rescheduling are calculated in consideration of the congestion information.

The above-mentioned formulas related to scheduling/rescheduling can be modified to make each stream from the queue conform to UPC parameters, such as PCR (Peak Cell Rate), SCR (Sustainable Cell Rate), and MBS (Maximum Burst Size). For example, let the timestamps TS for scheduling/rescheduling be calculated so that they conform to the PCR. In this event, the timestamps TS for scheduling/rescheduling are given by TS=max (TS+max (1/R, 1/PCR), CT) and TS=TS+max (1/R, 1/PCR), respectively. From this fact, it is readily understood that each cell is transmitted with a time interval of at least 1/PCR which is left between two adjacent ones of the cells and which is specified by a shaping timestamp determined on the basis of the timestamp TS for scheduling/rescheduling. This shows that the cell stream will conform to policing of the peak cell rate (PCR) at the next downstream switch. Hence, the downstream policing mechanism will neither tag nor discard the cells in the shaped cell stream. For example, a CLP (Cell Loss Priority) tag may not be put into a logic state of "1" in the present invention.

This is true of the SCR also. On policing the SCR, a timestamp for transmitting a next following cell is practically calculated with reference to the SCR value and a predetermined burst threshold (TH) that is determined by the value of MBS (Maximum Burst Size).

At any rate, the above-mentioned method according to the present invention realizes shaping operation. In other words, a scheduler according to the present invention can execute not only scheduling/rescheduling but also shaping.

Alternatively, the method according to the present invention may be used in combination with an ABR virtual source (VS) which executes traffic shaping to force a stream to conform to the requirements of ABR. In this event, a queue is shaped according to the rate determined by an ABR mechanism (along with the dynamic scheduling rate).

BRIEF DESCRIPTION OF THE DRAWINGS

FIG. 7 is a flow chart showing the procedure for computing a timestamp value when a cell arrives at a stream queue, taking into account wrap around.

FIG. 8 is a diagram of a single priority fine grain timewheel.

FIG. 9 is a diagram of a single priority coarse grain timewheel.

FIG. 10 is a diagram of a single priority ready list.

FIG. 11 is a diagram of a multi-priority fine grain timewheel.

FIG. 12 is a diagram of a multi-priority coarse grain timewheel.

FIG. 13 is a diagram of a multi-priority ready list.

FIG. 14 shows the procedure for attaching a stream queue identifier to a ready list.

FIG. 15 shows the procedure for inserting a stream queue identifier on a timewheel.

FIG. 16 shows the procedure for extracting a stream queue identifier from a ready list.

FIG. 19 is a diagram of a multi-priority fine grain timewheel with one priority level per time-bin.

FIG. 20 is a diagram of a multi-priority coarse grain timewheel with one priority level per time-bin.

FIG. 21 is a diagram of timewheel time-bins and a ready lists associated with FIGS. 19 and 20.

DETAILED DESCRIPTION OF THE PREFERRED EMBODIMENT

Figure 1:
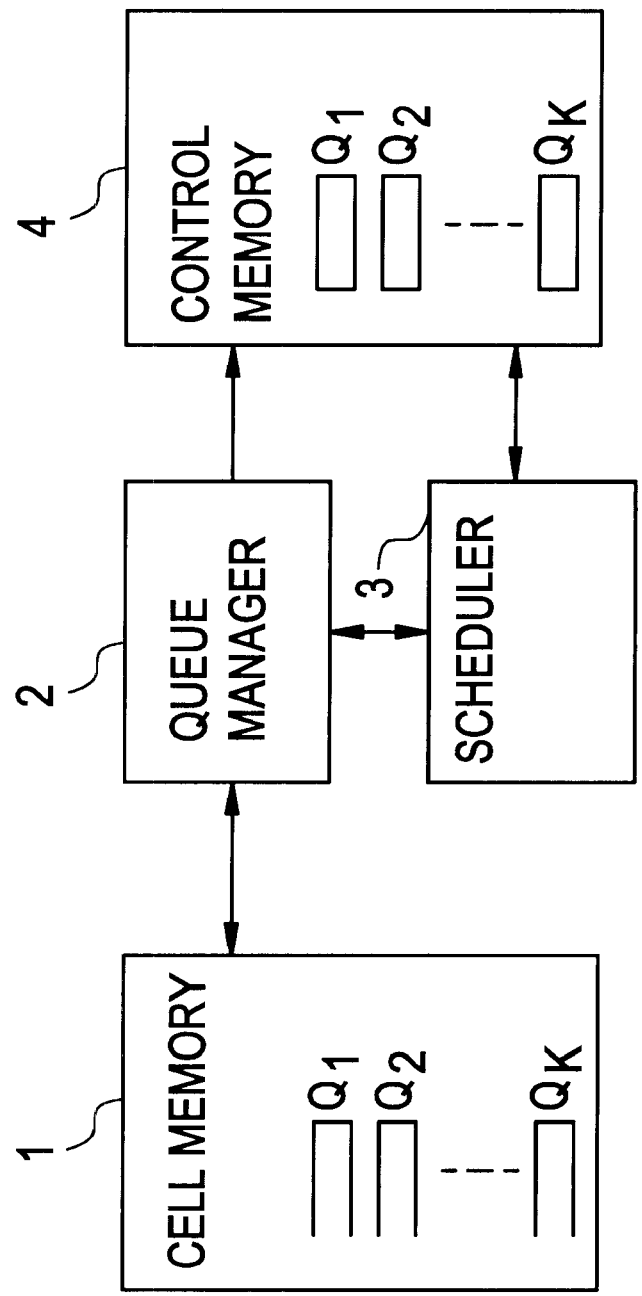
FIG. 1 is a diagram of the main components of an ATM buffer module serving a switch input or output port.

In an ATM switch or multiplexer, cells arrive at a bottleneck point and are stored in buffers to await transmission through the bottleneck towards their destinations. FIG. 1 depicts the main components of an ATM buffer module serving a switch input or output port: a queue manager 2, a scheduler 3, a cell memory 1 and a control memory 4. The module may, for example, be an output module or an input module of a switch.

Queue manager 2 stores arriving cells in cell memory 1 in the form of stream queues, $Q_1, Q_2, \ldots Q_K$. Control information for each queue is stored in control memory 4. Rather than store cells, queue manager 2 may drop cells if congestion arises. For example, a threshold-based cell discard mechanism may be used. During each cell time, queue manager 2 may choose a cell in memory to be transmitted to the next stage in the switch.

The choice of the next cell to transmit is determined by scheduler 3, which is the focus of the present invention. In the configuration of FIG. 1, scheduler 3 interacts with queue manager 2 as follows. During each cell time, queue manager 2 queries scheduler 3. Scheduler 3 responds with either a queue identifier or a null value. If scheduler 3 supplies a valid queue identifier, queue manager 2 removes the head-of-line cell at the corresponding stream queue in cell memory 1 and transmits the cell to the next stage.

Both queue manager 2 and scheduler 3 have access to control memory 4. Control memory 4 stores information, corresponding to each stream queue, which is used to perform buffer management and scheduling. K represents the total number of stream queues and $Q_i$ denote the ith stream queue. Control memory 4 contains a count of the number of cells in each stream queue and other control information that may be used by queue manager 2 or scheduler 3. Scheduler 3 performs time-based scheduling. As such, a timestamp value, $TS_i$, is maintained for $Q_i$. The timestamp value represents the next time epoch at which a stream queue is eligible to be served. Also, $Q_i$ is associated with two rates: a static, minimum guaranteed rate, $M_i$, and a dynamic rate, $R_i$, that is updated in accordance with DRC scheduling.

Scheduler 3 determines the stream queue (if any) to be served in the current cell transmission time. For a work-conserving scheduler, only the sequence of cell transmissions is important; i.e., whenever there is at least one cell in the buffers, a cell will be transmitted during the current cell time. By contrast, a non-work-conserving scheduler may allow a transmission slot to go idle even if there are cells in the buffer. In this case, the absolute time at which cells are transmitted is important.

In general, dynamic rate control (DRC) scheduling is non-work-conserving. Cells are scheduled for transmission at absolute time epochs. When cells arrive, they are queued on a per-stream basis. That is, cells corresponding to stream i are buffered in a First-In First-Out (FIFO) stream queue which is denoted as $Q_i$. Associated with stream queue $Q_i$ is a rate, $R_i$, which is computed dynamically based on congestion information at the bottleneck points through which stream i passes. Cell scheduling is achieved by peak rate shaping each stream according to its associated dynamic rate. This can be performed by means of a timestamp value, $TS_i$, which is updated to reflect the next time epoch at which queue $Q_i$ is eligible to be served. A timewheel data structure is used to store identifiers of stream queues waiting for their timestamp values to expire.

Figure 2:
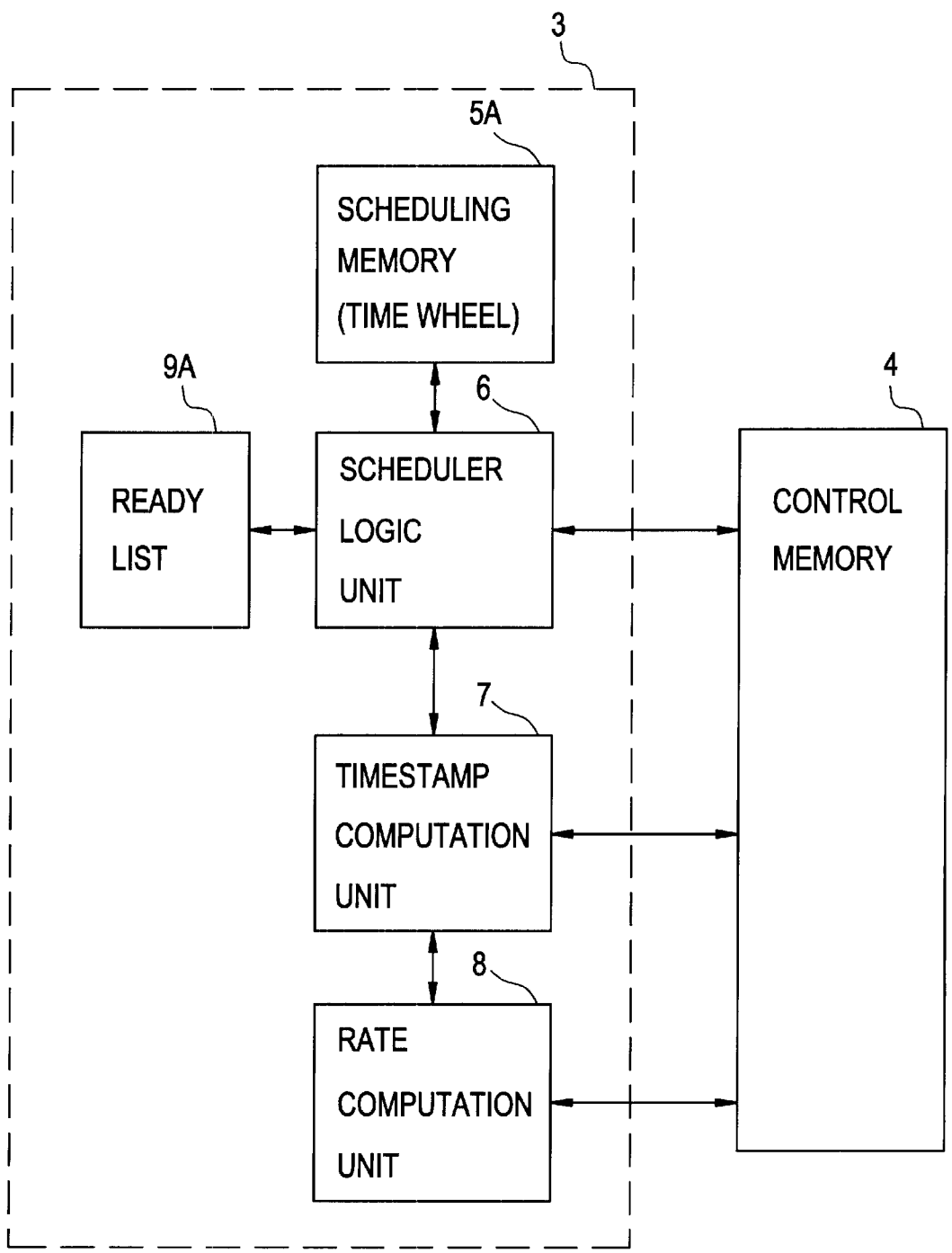
FIG. 2 is a diagram of one embodiment of the scheduler architecture of the present invention.

FIG. 2 is a block diagram of one embodiment of the scheduler architecture. Control memory 4 stores per queue information such as the timestamp value, rate and size of each stream queue. Rate computation unit 8 computes the rate for each stream queue based on external rate information and information stored in control memory 4. Timestamp computation unit 7 calculates the timestamp value for each queue. Stream queues are scheduled by means of scheduling memory 5A, which assumes the form of a timewheel data structure. Ready List 9A contains a prioritized list of stream queues to be serviced. The ready list is explained in more detail later in the specification. Timestamp computation unit 7, scheduling memory 5A and ready list 9A are all controlled and coordinated by scheduler logic unit 6.

Figure 3:
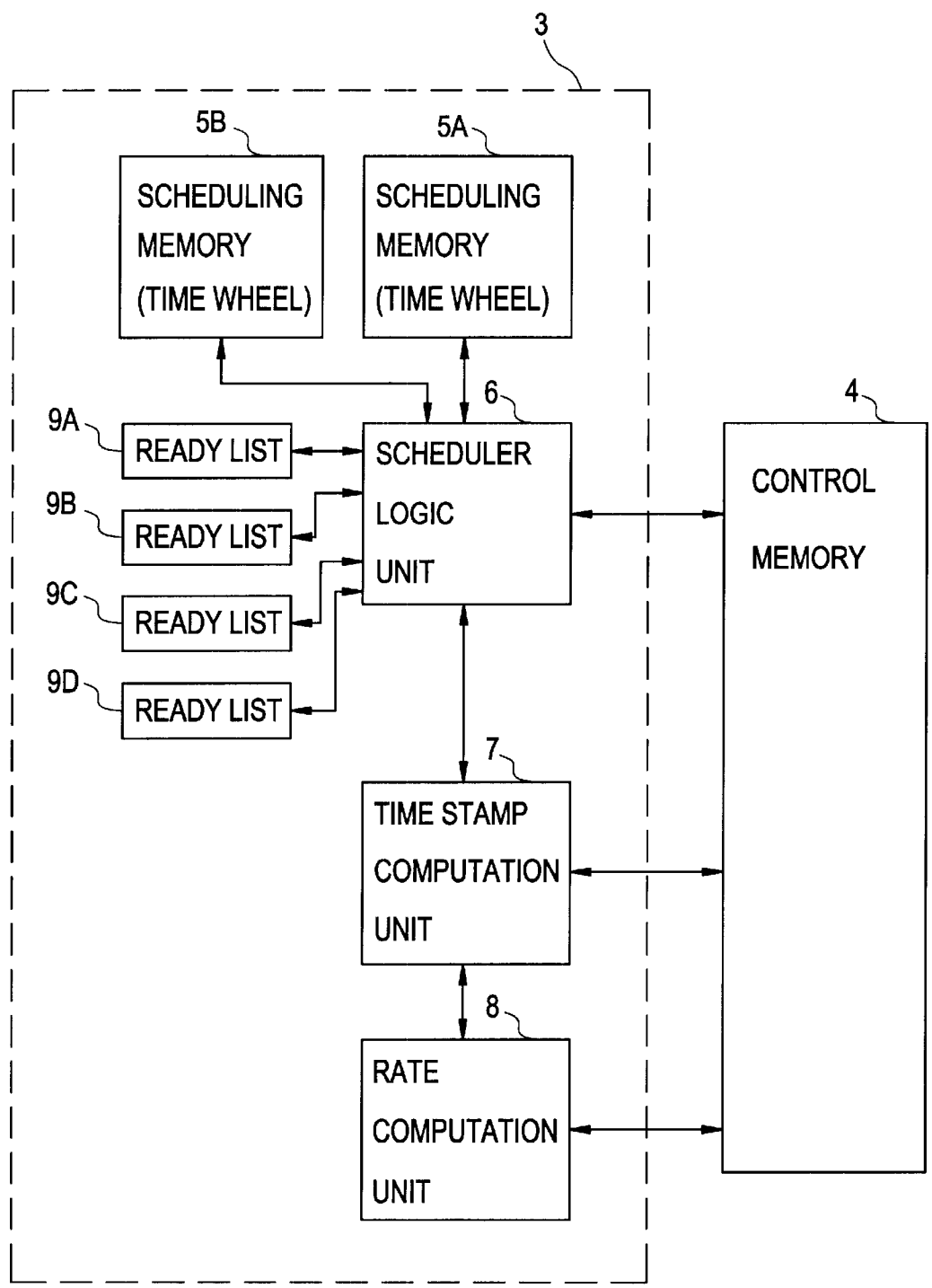
FIG. 3 is a diagram of another embodiment of the scheduler architecture of the present invention.

FIG. 3 is a block diagram of another embodiment of the scheduler architecture. The difference between this embodiment and the embodiment shown in FIG. 2 is that a second scheduling memory 5B and a plurality of ready lists 9B, 9C and 9D are used. In this architecture, the timewheel structure in one of the scheduling memories is a fine grain timewheel and the timewheel structure in the other scheduling memory is a coarse grain timewheel. These two different timewheel structures and plurality of ready lists are explained in more detail later in the specification.

SCHEDULING VIA TRAFFIC SHAPING

In an ATM network, a traffic shaper takes an input cell stream and introduces delays to certain cells, where necessary, to produce an output cell stream which conforms to the parameters of the shaping algorithm. The simplest example of a shaper is a peak rate shaper which ensures that the minimum inter-cell spacing is 1/R [seconds], where R is the specified peak rate. Traffic shaping is performed on the user side, prior to entry of the cell stream to the network. The purpose of traffic shaping is to smooth out a cell stream such that it requires less network resources and therefore, incurs a lower cost to the user.

The scheduler architecture and method of this invention is based on peak rate shaping each stream to a locally computed scheduling rate. Various forms of traffic shaping can be achieved by changing the shaping algorithm. The special case of peak rate traffic shaping will be described because it is the type of shaping required in the DRC scheduler. The peak rate shaping algorithm is simple in principle; however, a practical implementation must take into account the occurrence of wrap around due to the finite number of bits used to represent $TS_i$ and the current time (CT). A peak rate shaping algorithm, assuming that wrap around does not occur, is described in the following section. The Wrap Around Mechanism section describes a modified algorithm to handle wrap around.

Peak Rate Shaping

In the general case, a timestamp value, $TS_i$, is maintained for the ith stream. The value of $TS_i$ is updated when certain events occur, i.e., cell arrival or cell departure for stream i. Arriving stream i cells are stored in stream queue $Q_i$. In a given cell time, after an update of $TS_i$ (if any) the value of $TS_i$ represents the time at which the head-of-line cell in $Q_i$ (if any) is eligible to be transmitted. That is, when the value of CT equals or exceeds the value of $TS_i$, the head-of-line cell in $Q_i$ is eligible to be transmitted.

Initially, $TS_i$ is set to zero and each update of $TS_i$ increases it by a positive quantity. A current time variable, CT, keeps track of the real-time clock. Initially, CT is set to zero and is increased by one at the beginning of each successive cell time. Assuming that $TS_i$ and CT are each represented by n bits, after $2^n$ cell times, CT wraps around to the value zero. After a sufficient number of update events, the value of $TS_i$ also wraps around. The issue of wrap around is discussed in the next section. For the following discussion, it is assumed that wrap around is not a problem.

The timestamp value $TS_i$ is updated when one of the following events occurs:

1. Cell arrival from stream i or
2. Cell departure from stream i.

As an example of the implementation of the algorithm, assume that stream i is to be shaped to a peak rate $R_i$. This means that the inter-cell spacing of cell departures for stream i must be larger than, or equal to, $1/R_i$. If a stream i arrives to an empty $Q_i$, the cell is eligible to go out at the earlier of two times:

1. At time CT, i.e., immediately or
2. $1/R_i$ cell times after the last cell departure from $Q_i$.

Figure 4:
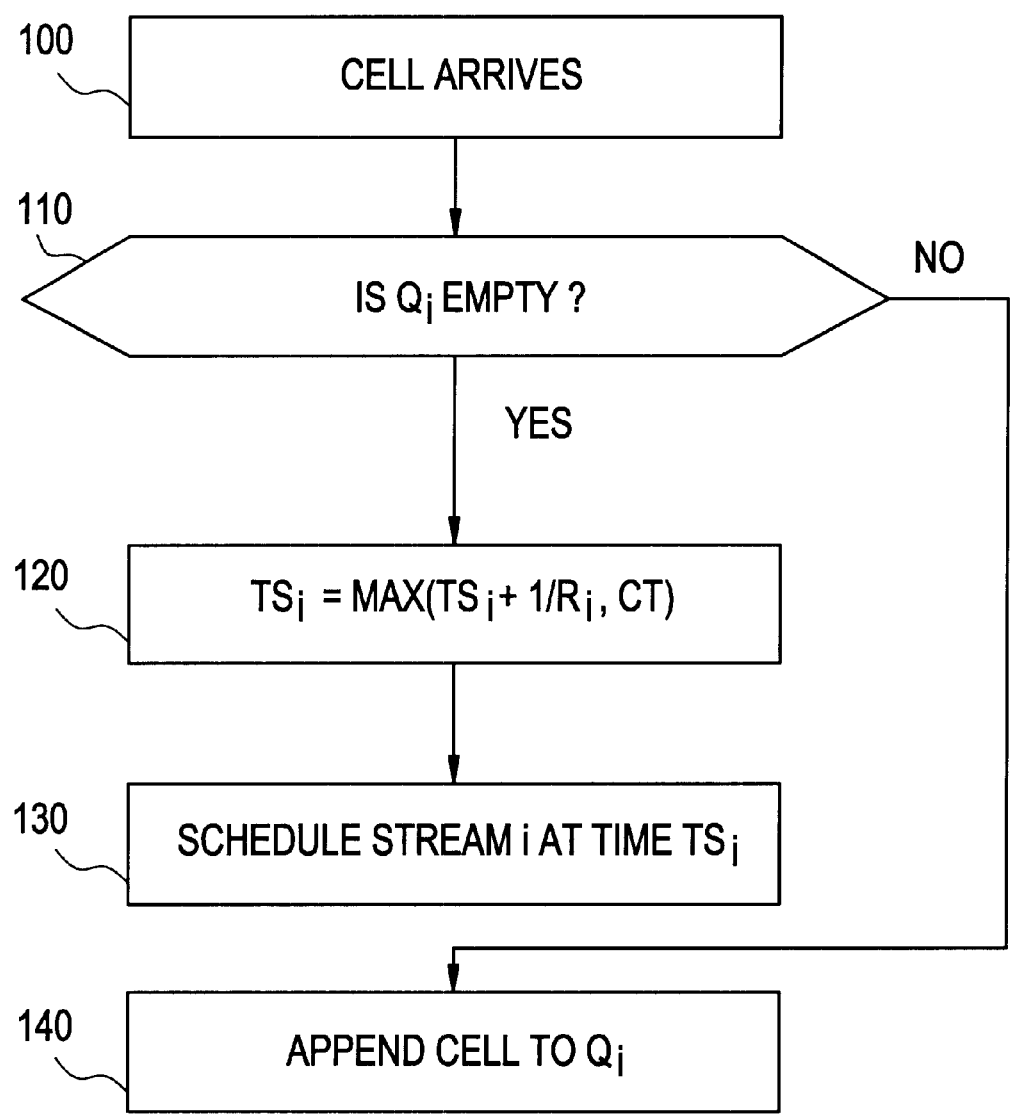
FIG. 4 is a flow chart showing the procedure for computing a timestamp value when a cell arrives at a stream queue (not taking into account wrap around).
Figure 5:
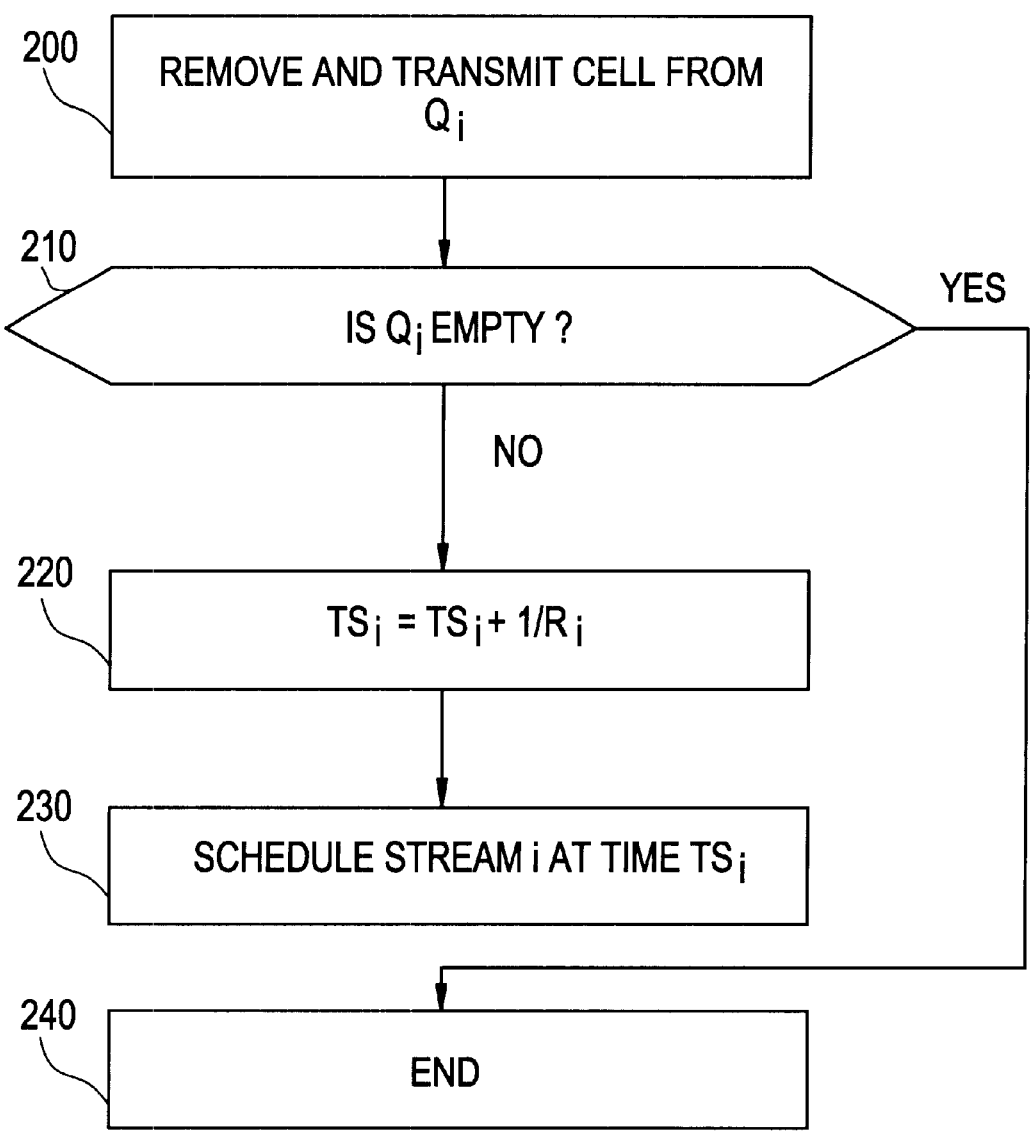
FIG. 5 is a flow chart showing the procedure for computing a timestamp value when a cell departs from a stream queue.

Accordingly, the timestamp value computation for peak rate shaping upon cell arrival and departure events for stream i is shown in FIGS. 4 and 5 and is described below.

After a cell arrives (step 100), the cell is appended to $Q_i$ if the stream queue is not empty (step 140). However, if the queue is empty, the stream must be scheduled (step 110). The timestamp value $TS_i$ is set at the maximum of ($TS_i+1/R_i$) or CT (step 120). Stream i is then scheduled at time $TS_i$ (step 130).

After a cell is transmitted from $Q_i$ (step 200), no timestamp calculation is performed if the queue is empty (step 240). However, if the queue is not empty, the stream must be scheduled (step 210). The timestamp value $TS_i$ is set at $TS_i+1/R_i$ (step 220). Stream i is then scheduled at time $TS_i$ (step 230). Scheduling a stream i at time $TS_i$ means to append a stream queue identifier for the stream to the timewheel at the time-bin corresponding to time $TS_i$.

Wrap Around Mechanism

As an example of the wrap around mechanism, assume that TS and CT are stored using n bits. The counter CT is initialized to zero and is increased by one during each cell time. After a cycle period of $2^n$ cell times, CT wraps around back to the value zero. Similarly, the timestamp value TS wraps around after it is increased beyond the value $2^n-1$. If CT advances past TS and wraps around, CT is said to be one cycle period ahead of TS.

Conversely, when a timestamp update event occurs, TS could be advanced past CT into the next cycle period. To keep track of the relative cycles in which the timestamp and current time lie, two 2-bit zone indicators are introduced, denoted by $z_{CT}$ and $z_{TSi}$ which correspond to CT and $TS_i$, respectively. When CT wraps around, $z_{CT}$ is increased by one (modulo four). Similarly, when $TS_i$ wraps around, $z_{TSi}$ is increased by one (modulo four). The zone bits are merely two bit extensions of the registers for $TS_i$ and CT. The interpretations of the zone bit values are shown in Table 1.

TABLE 1

Interpretation of zone indicators

| Zone comparison | Interpretation |
| --- | --- |
| $Z_{CT} = Z_{TSi}$ | CT and $TS_i$ are in same cycle |
| $Z_{CT} = (Z_{TSi} - 1)$ mod 4 | CT is one cycle behind TS |
| $Z_{CT} = (Z_{TSi} + 1)$ mod 4 | CT is one cycle ahead of TS |
| $Z_{CT} = (Z_{TSi} + 2)$ mod 4 | CT is two cycles ahead of TS |

In this example, it is assumed that $1/R_i<2^n$ for all streams i. This ensures that CT will never fall behind TS by more than one cycle. A mechanism to ensure that CT will never run ahead of TS by more than one cycle will now be described. Let $I_i$ be an idle bit for stream i, initially set to zero. If the value of $I_i$ equals zero, the stream is considered active; otherwise, if $I_i$ equals one, the stream is considered idle. A stream is considered idle at time CT if the most recent cell departure occurred more than $1/R_i$ cell times in the past.

Figure 6:
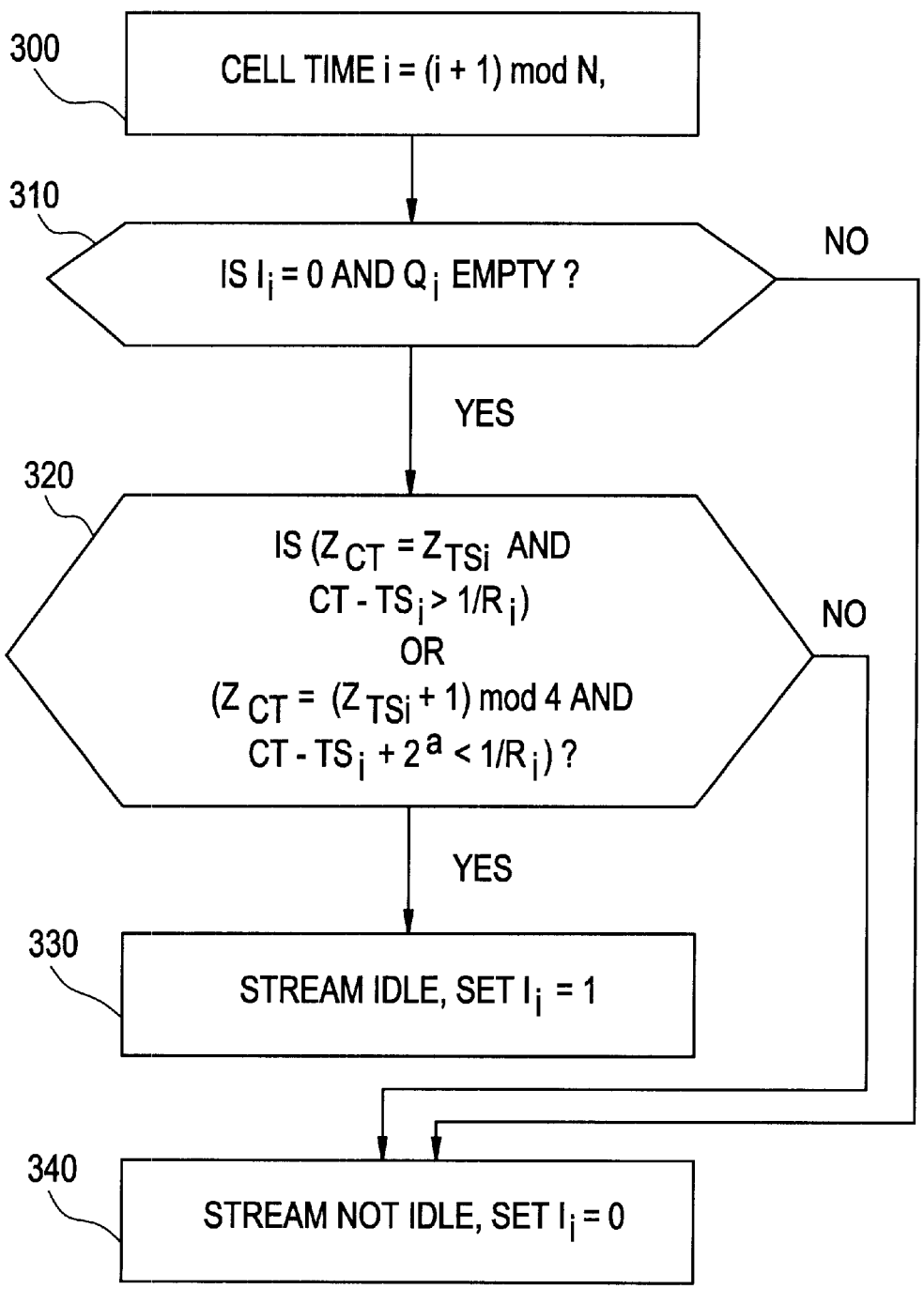
FIG. 6 is a flow chart showing the procedure for checking for the idle state of a stream queue during each cell time.

Next, an independent process is introduced that cycles through all of the streams to determine which ones are idle. For those streams i that are determined to be idle, the idle bit $I_i$ is set to one. Let $N_s$ denote the total number of streams. It is assumed that only one queue can be tested for idleness during one cell time. To ensure that CT never advances two or more cycles ahead of $TS_i$, the maximum number of streams that can be supported should be less than $2^n$. During each cell time, the check for idleness proceeds as shown in FIG. 6 and as described below.

At cell time i=(i+1) mod $N_s$ (step 300), a determination is made whether the stream is not idle ($I_i=0$) and the queue is empty (step 310). If both conditions are not met, the idle bit $I_i$ is set to, or kept at, 0 (step 340). If both conditions are met, the zones indications are analyzed as follows (step 320): If ($z_{CT}=z_{TSi}$ and CT–$TS_i>1/R_i$) or [$z_{Ct}=(z_{TSi}+1)$ mod 4 and CT–$TS_i+2^n<1/R_i$)], the stream is considered to be idle and $I_i$ is set to 1 (step 330). If both conditions are not met, $I_i$ is set to, or kept at, 0 (step 340).

$I_i$ must be reset to zero whenever a stream i cell arrives. Besides this modification, the shaping algorithm takes into account the values of the zone indicators in comparing the values of CT and $TS_i$. The procedure for handling a cell arrival for stream i is shown in FIG. 7 and is described below.

After a cell arrives (step 400), $I_i$ is set to 0 and $TS_i$ is set to $TS_i+1/R_i$ (step 410) and the status of the queue is checked (step 420). If the queue is not empty, the cell is appended to the queue (step 460). If the queue is empty, a determination is made regarding the idle state of the queue and the zone indications as follows: If $I_i=1$ or ($z_{CT}=z_{TSi}$ and CT$\geq TS_i$) or [$z_{CT}=(z_{TSi}+1)$ mod 4 or $z_{CT}=(z_{TSi}+2)$] mod 4 (step 430), TS is set at CT (step 440). If the conditions are not met, the stream is scheduled at time $TS_i$ (step 450).

SCHEDULING MEMORY

Timewheel

Timestamp-based algorithms for traffic shaping were discussed in the Scheduling via Traffic Shaping section above. Each stream queue $Q_i$ has an associated timestamp value, $TS_i$, which indicates the time epoch when the stream queue becomes eligible for service.

During the current cell time, CT, any stream queue with a timestamp value satisfying $TS_i<CT$ is eligible for service. Although multiple stream queues may become eligible in the same time slot, only one cell from one of the queues may be transmitted in each time slot.

Therefore, a ready list of eligible stream queues is maintained. At time CT, any newly eligible stream queues are moved to the ready list. During the cell time, one of the stream queues from the ready list is chosen for service. Queue manager 2 handles the removal of the head-of-line cell from the cell memory and the transmission of the cell to the next switching stage.

The basic mechanism behind traffic shaping is simple. Cells arriving from a given stream are queued in FIFO order per stream. During a given time, the head-of-line cell in a stream queue, say $Q_i$, is scheduled to be transmitted at the time epoch indicated by the timestamp value, $TS_i$. As discussed in the previous section, the timestamp value is updated either upon arrival or departure of a cell from stream queue $Q_i$. The timestamp $TS_i$ is updated based on the current value of $TS_i$, the current time CT, and the dynamic rate $R_i$.

If the updated value of $TS_i<CT$, the head-of-line cell in stream queue $Q_i$ is eligible to be transmitted immediately, i.e., in the current cell time. However, there may be several streams i for which $CT \geq TS_i$.

Therefore, a ready list of eligible stream queues which have not yet been served is maintained. If the updated value of $TS_i$ is greater than CT, then the stream queue is eligible at some future time. A timewheel structure, also called a calendar queue, is used to schedule stream queues which will become eligible for service at a future time.

The structure of the timewheel can be described as a circular array of entries numbered $0, 1, \ldots N-1$, where the nth entry points to a (possibly empty) list of eligible stream queues scheduled for time n (modulo N). After each clock tick, the value of CT is updated to point to the next entry on the timewheel. All stream queues on the list corresponding to this entry then become eligible for service. This list is then appended onto the ready list. During each cell time, one or more stream queues from the ready list are served. The maximum number of stream queues which can be served within one cell time is constrained by the speed of the logic and memory.

Reduction of Timewheel Size

The traffic shaper should be capable of supporting a wide range of rates. To support connection rates in the range 4 Kbps to 622 Mbps requires about 150 K entries in the timewheel. Each entry consists of six pairs of head/tail pointers. Assuming that up to 64 K streams are to be supported, each pointer requires 16 bits, or 2 bytes. Thus, the memory required for each entry is 24 bytes. The total memory requirement for the timewheel alone would then be 3.6 Mbytes.

This memory requirement can be reduced significantly by using two timewheels as follows (see FIGS. 8 and 9):

1. a fine grain (FG) timewheel, where each entry corresponds to one cell time.
2. a coarse grain (CG) timewheel, where each entry corresponds to a several cell times.

In this example, it is assumed that each timewheel consists of 2 K entries and stream queues are assigned to either the FG timewheel or the CG timewheel, according to rate.

With a line rate of 600 Mbps, the lowest rate for a flow that can be supported by the FG timewheel is:

$(600\times10^6)/(2\times10^3)=300\times10^3$, or 300 Kbps. On the other hand, if the CG timewheel is to support a rate of 4 Kbps, then the smallest granularity that can be supported corresponds to the rate:

$(4\times10^3)\times(2\times10^3)=8\times10^6$, or 8 Mbps. In this case, one entry on the CG timewheel corresponds to:

$(600\times10^6)/(8\times10^6)\approx75$ entries on the FG timewheel. To simplify things, this number is rounded to the nearest power of two, therefore, the granularity of the CG timewheel is set at 64 cell times. Then, each entry in the CG timewheel is also set at 64 entries of the FG timewheel. In units of time, the granularity of the CG timewheel is 44.8 $\mu$s compared to 700 ns for the FG timewheel. Rates are assigned to the two timewheels as follows:

FG timewheel: 300 Kbps to 600 Mbps,
CG timewheel: 4 Kbps to 300 Kbps.

In this example, for a 300 Kbps constant bit rate stream, the error introduced by the CG timewheel, as a percentage of the inter-cell distance, is approximately 3.2%.

There is no need to assign stream queues to the two timewheels in a static manner based on rate. Instead, the stream is scheduled based on the bit rate stream and the error introduced by the CG timewheel, as a percentage according to the relative values of the timestamp value TS and the value of the current time CT, as follows:

if $TS \leq CT$, then
    Assign the stream element directly to the ready list.
else if TS−CT>2000, or TS is a multiple of 64, then
    Assign the stream element to the CG timewheel.
else
    Assign the stream element to the FG timewheel.
end if Note that in the above pseudo-code, a stream is scheduled for the CG timewheel if the timestamp is a multiple of 64. Doing this avoids the need to access both timewheels in the same cell time.

Memory Requirement

Each entry in one of the two timewheels consists of six pairs of head/tail pointers (hp/tp), requiring 24 bytes of memory. Counting both timewheels, with 2000 entries each, the total memory requirement is then about 96 Kbytes, an order of magnitude improvement from using a single timewheel. What is lost in going from the single large timewheel to two small timewheels is coarser granularity in scheduling low rate connections and an increased probability of bunching at scheduled time slots on the coarse timewheel. However, since low rate connections generally have greater tolerance for cell delay variation, this effect is not significant.

The bunching effect due to coarser scheduling granularity can be improved by increasing the number of entries in each timewheel. For example, if the number of entries in each timewheel is doubled to 4000, the FG timewheel can support rates in the range 150 Kbps to 600 Mbps. Furthermore, the granularity of the CG timewheel is improved to 22.4 $\mu$s. In this case, each entry of the CG timewheel corresponds to 32 entries of the FG timewheel (i.e., 32 cell times).

Priority Levels

During one cell time, a fixed number of stream queues (i.e., one or two) can be served within one cell time (the maximum number depends on the memory technology that is used). However, several stream queues may become eligible during the same time slot. Thus, a backlog of eligible stream queues could form. To accommodate stream queues with different tolerances for cell delay variation (CDV), four priority levels are provided. The priorities are listed from high to low as follows:

0 Dynamic high priority (HP),
1 Real-time, short CDV (RT-S),
2 Real-time, long CDV (RT-L), and
3 Non-real-time (NRT).

HP is a dynamic assignment. Eligible stream queues that have been scheduled at their minimum guaranteed rates are automatically assigned as HP. This ensures that all stream queues receive their minimum rate guarantees on a short time-scale. The remaining three priority levels are assigned statically, according to traffic class and tolerance for cell delay variation. Streams classified as RT-S are real-time streams which have small CDV tolerances, while RT-L streams have larger CDV tolerances. Non-real-time (NRT) streams generally do not have requirements on CDV.

In general, low bit-rate real-time streams would be classified as RT-L, while high bit-rate real-time streams would be classified as RT-S. However, the CDV tolerance of a stream need not be directly related to its bit-rate. The static priority levels protect streams with small CDV tolerance from the bunching effects of streams with larger CDV tolerances. For example, consider a scenario in which there are one thousand 64 kbps voice streams sharing a 150 Mbps link with a single 75 Mbps multimedia stream.

Assuming that the multimedia stream is a constant bit rate (CBR), it needs to send a cell once every two cell times. If cells from the voice streams are bunched together at or near the same time slot, a natural consequence of superposition, the multimedia stream will suffer from severe CDV, relative to its inter-cell gap of one cell time. In the worst-case, two cells from the multimedia stream could be separated by up to one thousand voice cells.

External Storage

The scheduler data structures for a single priority level are depicted in FIGS. 8–10. For multiple priority levels, the timewheel structures and the ready list are replicated for each level (see FIGS. 11–13). For example, if there are L priority levels, then each time-bin would consist of L distinct lists, one for each priority level. A timewheel consists of a set of consecutive time-bins labelled in increasing order of time. In this embodiment, a timewheel consists of 2K time-bins, numbered consecutively from 0 to 2K−1. Note that the number of time-bins may vary depending on the particular application.

To economically handle a large range of bit rates, a plurality of timewheels are used. In this embodiment two timewheels are used: a fine grain and a coarse grain timewheel. The fine grain timewheel time-bins correspond to cell times numbered $0, 1, \ldots 2K-1$. The coarse grain timewheel time-bins correspond to cell times numbered $0, 64, 128, \ldots, (64*2K)-1$. Note that the different timewheels do not have to contain the same number of time-bins. Generally speaking, the fine grain timewheel is used for scheduling high rate streams, while the coarse grain timewheel is used for scheduling lower rate streams, although this distinction is not a strict property of the scheduling algorithms to be described below.

Each timewheel time-bin is associated with stream queues which are scheduled for the same time slot. Because up to 64K streams are to be supported, a stream pointer, or stream queue identifier, is identified with a 16-bit word. Each timewheel time-bin consists of head and tail pointers (hp and tp) which point to locations in a stream pointer memory. These pointers for a list for each time-bin. The stream pointer memory consists of 64K entries. Each entry in the stream pointer memory is a 16-bit pointer to another stream. Thus, the stream pointer memory is logically 64K deep and 16 bits wide. The stream pointer memory is defined as follows:

Word V[0 ... (64K−1)], where Word denotes a 16-bit integer type. The coarse timewheels are defined by:

Queue $T_C$ [0 ... 3][0 ... (2K−1)], while the fine timewheels are defined by

Queue $T_F$ [0 ... 3][0 ... (2K−1)], where the type Queue is a compound data type defined as follows:
  Word hp;
  Word tp;

For example, the head pointer at time 2 on the coarse grain timewheel and on priority 3 is denoted by:

$T_C$[3][2].hp

Both the stream pointer memory and the timewheel memory are external to the scheduler control logic.

The size of the ready list is a measure of the backlog in the scheduler. By applying local dynamic rate control (DRC), the scheduler can be made nearly work-conserving. Since the DRC computation is based on queue length information, it is necessary to maintain a count of the number of entries on the ready list. This can be done by storing a count of the number of stream queue identifiers in each time-bin. Since there are at most 64 K active streams, the maximum number of stream queue identifiers in one time-bin is 64 K, so the counter size needed is at most 16 bits. Therefore, the counts for the coarse and fine timewheels are defined, respectively, as follows:

Word $M_C$ [0 ... (2K−1)]

Word $M_F$ [0 ... (2K−1)]

When the current time value, CT, advances to point to the next time-bin, all stream queue identifiers associated with the time-bin become eligible for service. That is, the scheduled timestamps for the streams corresponding to these stream queue identifiers expire and the streams are ready to be served. Expired stream queue identifiers are maintained in a ready list. The ready list contains stream queue identifiers which are ready to be served, but which have not yet been processed. When the scheduler receives an external stream service request, a stream queue identifier is removed from the head of the ready list and the stream queue identifier is either sent to an internal output queue or transmitted to an external process.

Within the control logic there are bit maps which are in one-to-one correspondence with the timewheel memories:

Bit $B_C$ [0 ... 3][0 ... 2K−1]

Bit $B_F$ [0 ... 3][0 ... 2K−1]

$B_C$ and $B_F$, respectively, denote the coarse and fine grain bit maps. The bit maps are initialized to zero, indicating that all timewheel time-bins are initially empty. A value of one in a bit map entry indicates that the corresponding timewheel time-bin is not empty. There is one ready list for each priority level:

Queue r[0 ... 3]

An empty ready list i is indicated by setting r[i].hp=0. We also define an integer variable rc which counts the total number of entries on all ready lists.

Scheduling

Current time is stored in a 17-bit counter denoted CT. Two auxiliary bits stored in $z_{CT}$ indicate the zone of CT. The zone, $z_{CT}$, takes on the values 0, 1, 2, or 3. When CT wraps around from 128K−1 to zero, $z_{CT}$ is incremented by one (modulo four). Similarly, the timestamp value, $TS_i$, for stream queue $Q_i$ is stored as a 17-bit number with the zone indicated by two bits stored in $z_{TSi}$. If $z_{CT}=z_{TSi}$, i.e., if current time and the timestamp value are in the same zone, then CT and $TS_i$ can be compared directly. If $z_{CT}=(z_{TSi}-1)$ mod 4, then $Ts_i$ represents a time in the next zone, i.e., in the future with respect to CT. Otherwise, if $z_{CT}=(z_{TSi}+1)$ mod 4 or $z_{CT}=(Z_{TSi}+2)$ mod 4, then $TS_i$ represents a time in a previous zone, i.e., in the past with respect to CT.

After each cell time, the current time CT is advanced by one. Before CT is advanced, any stream queue identifiers associated with the time-bin at CT must be attached to the appropriate ready lists. FIG. 14 describes the procedure for attaching stream queue identifiers to the appropriate ready list. The first part of the procedure determines whether CT corresponds to the coarse grain or the fine grain timewheel. All time-bins which are located at multiples of 64 are stored on the coarse grain timewheel.

The counter memory $M_X$ is read once. The timewheel head and tail pointers are read once for each priority level. This gives a total of eight reads to the timewheel. The stream pointer memory, V, is written at most once for each priority level, giving a total of four reads. The internal bit map $B_X$ is accessed at most twice for each priority level, giving a total of eight accesses. The ready list pointer r is written four times and read twice for each priority level, for a total of twelve accesses. Finally, a read-modify-write access is needed to increment rc. If separate memories are used for the three external memories, the worst-case number of memory access times required for this operation is eight. A summary of the accesses to memory for transferring the lists from the time-bin corresponding to current time CT to the corresponding ready lists are summarized in Table 2.

TABLE 2

| Memory | Accesses to memory | | |
|---|---|---|---|
| | Read | Write | Read-Modify-Write |
| $M_x$ | 1 | 0 | 0 |
| $T_x$ | 8 | 0 | 0 |
| V | 0 | 4 | 0 |
| $B_x$ | 4 | 4 | 0 |
| r | 4 | 8 | 0 |
| rc | 0 | 0 | 1 |

If a stream queue identifier is to be added to the timewheel at position TS and that stream is to be scheduled at priority i, the procedure described in FIG. 15 determines the timewheel (coarse or fine) and time-bin at which the stream queue identifier should be inserted. The variable X is set to F if the fine grain timewheel is to be used and C if the coarse grain timewheel is to be used. The time-bin location is stored as variable t.

This procedure requires one read-modify-write to update the count $M_X$. In the worst case, two writes to $T_X$ are needed, and one write to V. One write and one read access are made to the internal bit map $B_X$. Therefore, in the worst case, two external memory accesses are needed to insert a new stream queue identifier to the timewheel. The accesses to memory for inserting a new stream queue identifier to the timewheel are summarized in Table 3.

TABLE 3

| Memory | Accesses to memories for inserting new stream queue identifiers to the timewheel | | |
|---|---|---|---|
| | Read | Write | Read-Modify-Write |
| $M_x$ | 0 | 0 | 1 |
| $T_x$ | 0 | 2 | 0 |
| V | 0 | 1 | 0 |
| $B_x$ | 1 | 1 | 0 |

FIG. 16 describes the procedure for extracting a stream queue identifier from the ready lists in order of priority. When the ready list for priority 0 (high) is exhausted, the ready list for priority 1 (lower) is examined, etc. The extracted stream queue identifier is stored as variable q, which is passed on to another process which transmits the head-of-line cell from the queue corresponding to q.

For each stream queue identifier that is extracted from the ready list, at most one read from the stream pointer memory V is required. Two reads and one write to the ready list pointers r are needed. Finally, a read-modify-write operation is necessary to increase the counter ready list counter rc. The accesses to memory for inserting a new stream queue identifier to a timewheel are summarized in Table 4.

TABLE 4

| Memory | Accesses to memories for inserting new stream queue identifier to timewheel | | |
|---|---|---|---|
| | Read | Write | Read-Modify-Write |
| V | 0 | 1 | 0 |
| r | 2 | 1 | 0 |
| rc | 0 | 0 | 1 |

Accesses in One Cell Time

The operations required in one cell time are listed (in order) in Table 5. In the worst case, 17 memory accesses (in parallel for separate memories) are required during one cell time. This number could be improved by reading and writing head/tail pointers on the timewheel at the same time. Note that if time allows during a cell time, step 4 may be repeated. Table 5. Memory accesses for inserting new stream queue identifier to timewheel.

TABLE 5

| Memory accesses for inserting new stream queue identifier to timewheel. | |
|---|---|
| Cell operation | Worst-case Accesses |
| 1. Reschedule (insert new stream) | 2 |
| 2. Schedule (insert new stream) | 2 |
| 3. Transfer list of stream queue identifiers from CT-bin to ready list | 12 |
| 4. Extract stream queue identifier from ready list | 1 |
| | 17 |

To summarize, the method for scheduling stream queues containing cells in an ATM switch, without taking into account priority, comprises the following main steps:

(a) calculating a scheduling rate value for each stream;

(b) calculating a timestamp value for each stream queue based on its scheduling rate value;

(c) scheduling each stream queue by assigning a stream queue identifier to a first timewheel scheduling memory time-bin based on its timestamp value;

(d) transferring a list of stream queue identifiers from a time-bin on the timewheel to a ready list when a current time value equals the time-bin value;

(e) choosing a first stream queue identifier from the ready list; and (f) transmitting a first cell in the stream queue corresponding to the chosen stream queue identifier;

wherein the timestamp and current time values cycle.

The method for scheduling stream queues containing cells in an ATM switch, taking into account priority, comprises the following main steps:

(a) calculating a scheduling rate value for each stream;

(b) calculating a timestamp value for each stream queue based on its scheduling rate value;

(c) assigning one of at least two priority levels to each stream queue, wherein the priority levels are assigned different values from high to low;

(d) scheduling each stream queue by assigning a stream queue identifier to a timewheel scheduling memory time-bin based on its timestamp value and its priority level;

(e) transferring a list of stream queue identifiers from a time-bin on the timewheel to a ready list at the appropriate priority level when a current time value equals the time-bin value;

(f) choosing a first stream queue identifier from the highest priority non-empty ready list; and (g) transmitting a first cell in the stream queue corresponding to the chosen stream queue identifier;

wherein the timestamp and current time values cycle.

One aspect of the multiple priority level embodiment described above is that during one cell time, the different priority lists at the time-bin corresponding to the current time value CT are transferred to the corresponding ready lists one at a time. An alternate embodiment of the scheduler architecture supporting multiple priorities is described below with reference to FIGS. 19–23.

FIGS. 19 and 20 show examples of this embodiment with two timewheels. There are L=4 priority levels and the granularity of the coarse grain timewheel is G=64. The fine grain timewheel consists of M*L entries and the coarse grain timewheel consists of N*L entries. Each time-bin on the FG timewheel corresponds to one cell time and each time-bin on the CG timewheel corresponds to G cell times. For this example, it is assumed that the values of L and G are both powers of two. The time-bins of the FG timewheel are assigned priority levels by labelling the time-bins cyclically in priority level order. For example, 0, 1, 2, 3, 0, 1, 2, 3, etc., as shown in FIG. 19. Similarly, the time-bins of the CG timewheel are assigned priority levels.

Each timewheel entry (i.e. time-bin) consists of a list of stream queue identifiers. During each cell time the list at the time-bin corresponding to current time CT is transferred to the ready list at the priority level assigned to the time-bin. The ready lists are also lists of stream queue identifiers. During each cell time, one stream queue identifier is removed from the non-empty ready list of the highest priority (if one exists). The first cell from the corresponding stream queue is transmitted and then the stream queue is rescheduled if it remains non-empty.

Figure 22:
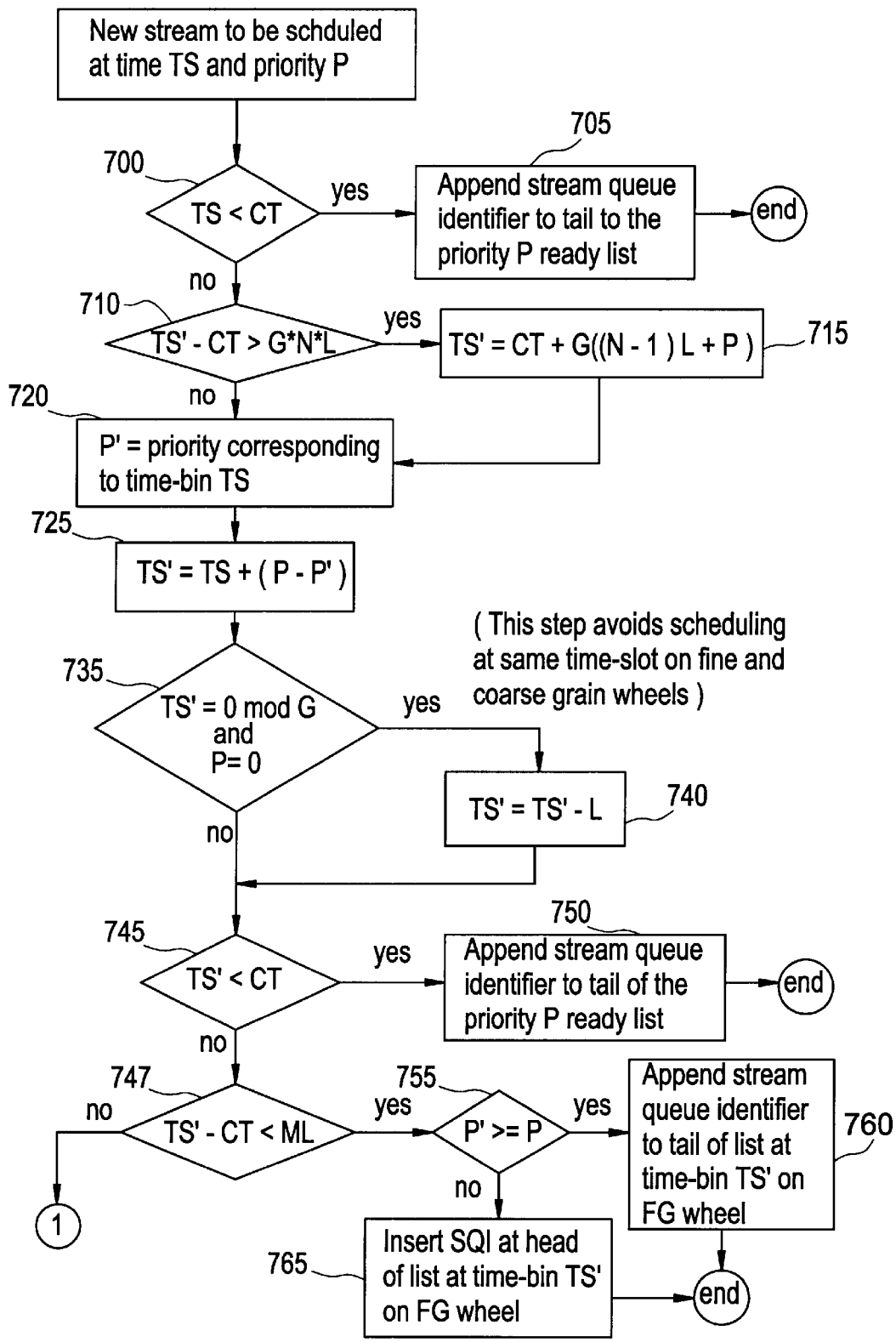
FIGS. 22 and 23 show timewheel scheduling operations.
Figure 23:
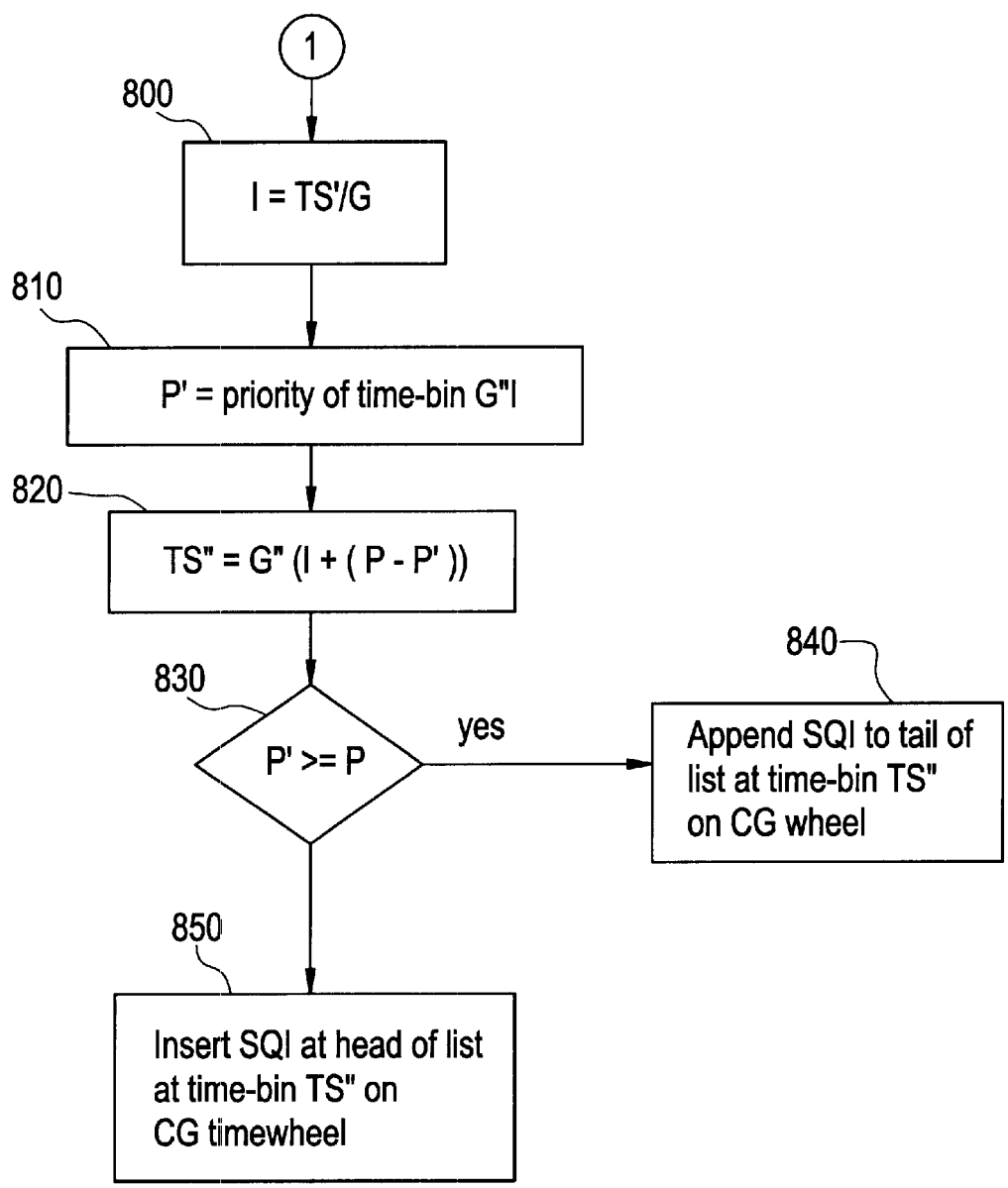

FIGS. 22 and 23 show the procedures of scheduling a new stream with associated timestamp value TS at priority level P. Note that these figures do not take into account possible wrap around situations. If a wrap around situation occurs, additional procedures along the lines discussed in the Wrap Around Mechanism section would be required.

The first step in scheduling a new stream at time TS and priority level P is to compare TS to CT (step 700). If TS is less than CT, the stream queue identifier is appended to the tail of the priority P ready list (step 705) and the procedure ends.

If TS is not less than CT, (TS−CT) is compared to (G*N*L) (step 710). G represents the granularity of the coarse grain timewheel. If (TS−CT) is greater than (G*N*L), TS' is set to the possible scheduled time value of CT+G*((N−1)*L+P) (step 715). N determines the size of the fine grain timewheel which is given by N*L. L represents the number of priority levels. Then P' is set to correspond to the priority of time-bin TS (Step 720). Note that if (TS−CT) is not greater than (G*N*L), TS is not modified and the procedure moves directly to step 720.

Next TS' is set to TS+(P−P') (step 725). If TS is a multiple of G and P=0 (step 735), TS' is set to TS'−L (step 740). Then TS' is compared to CT (step 745). Note that if TS is not a multiple of G or P=0, TS' is set to TS'−L, TS' is not modified and the procedure moves directly to step 745.

If TS' is less than CT, the stream queue identifier is appended to the tail of the priority P ready list (step 750) and the procedure ends. If TS' is not less than CT, TS'−CT is compared to M*L. M*L (step 747). M determines the size of the coarse grain timewheel which is given by M*L. If TS'−CT is not less than M*L, the stream is scheduled on the coarse grain timewheel as shown in FIG. 23 and as described below.

If TS'−CT is less than M*L, P' is compared to P (step 755). If P' is greater than or equal to P, the stream queue identifier is appended to the tail of the list at time-bin TS' on the fine grain timewheel (step 760) and the procedure ends.

If P' is greater than or equal to P, the stream queue identifier is inserted at the head of the list at time-bin TS' on the fine grain timewheel (step 765) and the procedure ends.

If the stream is to be scheduled on the coarse grain timewheel, the procedure in FIG. 23 is followed. First, I is set to TS'/G (step 800). Then P' is set to the priority level corresponding to time-bin G*I (step 810). Next, TS" is set to G*(I+(P−P")) (step 820).

Then P' is compared to P (step 830). If P' is greater than or equal to P, the stream queue identifier is appended to the tail of the list at time-bin TS" on the coarse grain timewheel (step 840) and the procedure ends. If P' is not greater than or equal to P, the stream queue identifier is inserted at the head of the list at time-bin TS" on the coarse grain timewheel (step 850) and the procedure ends.

RATE COMPUTATION

In DRC scheduling the scheduling rate for a given stream is updated dynamically. In DRC scheduling, the dynamic rate, $R_{drc}$, is computed as the sum of a minimum guaranteed rate M and an excess rate E which reflects the excess bandwidth available to the stream at various bottleneck points along its path:

$$R_{drc} = M + E.$$

A local dynamic rate, $E_{loc}$, can be computed based on the utilization observed as queues are transferred from the ready list. In this way, the scheduler is made nearly work-conserving at the local bottleneck. An external excess rate, $E_{ext}$, computed at a downstream bottleneck within the switch, may serve as input to the rate computation engine.

In this case, the DRC excess rate is taken as:

$$E = \min(E_{loc}, E_{ext})$$

The rate, $E_{ext}$, may itself be the minimum of several DRC rates computed at bottleneck points along the path of the stream inside the switch. This rate information is carried by internal resource management (IRM) cells.

Local DRC Rate Computation

DRC scheduling is discussed in more detail in co-pending application Ser. No. 08/924,820. A brief description of how DRC can be applied locally will be provided. The local DRC excess rate, denoted by Elm can be calculated based on the measured local utilization, $\hat{U}_{loc}$. A proportional-derivative (PD) controller iteratively computes a new value of $E_{loc}$ so as to minimize the difference between the measured utilization and the target utilization $U_{loc}$. The controller has the form:

$$E_{loc}(n+1)=E_{loc}(n)+\alpha_1(U_{loc}-\hat{U}_{loc})+\alpha_2(U_{loc}-\hat{U}_{loc})$$

where the filter coefficients $\alpha_1$ and $\alpha_2$ are chosen to ensure stability and fast convergence. Class-based E can be computed in analogous way.

ABR Virtual Source

In ABR virtual source control (see, "Traffic Management Specification, Version 4.0," The ATM Forum, 1996), the scheduler mimics the behavior of an ABR source. ABR resource management (RM) cells carry explicit rate (ER) information which determines the rate at which cells are transmitted. This external rate, which we denoted by $R_{abr}$, is used by the local scheduler to shape the ABR stream. ABR virtual source control can be easily combined with DRC scheduling by taking the scheduling rate for an ABR stream as the minimum of the rates computed for DRC and ABR VS control; i.e., $$R=\min(R_{abr}, R_{drc});$$

wherein, $R_{drc}$ represents a locally computed rate for DRC scheduling. An example of an algorithm for calculation of $R_{abr}$ is contained in the "Traffic Management Specification, Version 4.0."

Usage Parameter Control

In addition to scheduling cells for stream i at the scheduling rate $R_i$, the scheduler architecture can be used to perform traffic shaping for each stream in conformance with the UPC (Usage Parameter Control) specification in "Traffic Management. Specification, Version 4.0," The ATM Forum, 1996). In particular, how stream i can be simultaneously scheduled at rate $R_i$ and shaped to conform to GCRA(1/PCR$_i$, 0) and GCRA(1/SCR$_i$, THi) is discussed briefly below. (For a specification of the Generic Cell Rate Algorithm for UPC policing, see "Traffic Management Specification, Version 4.0," The ATM Forum, 1996).

Figure 17:
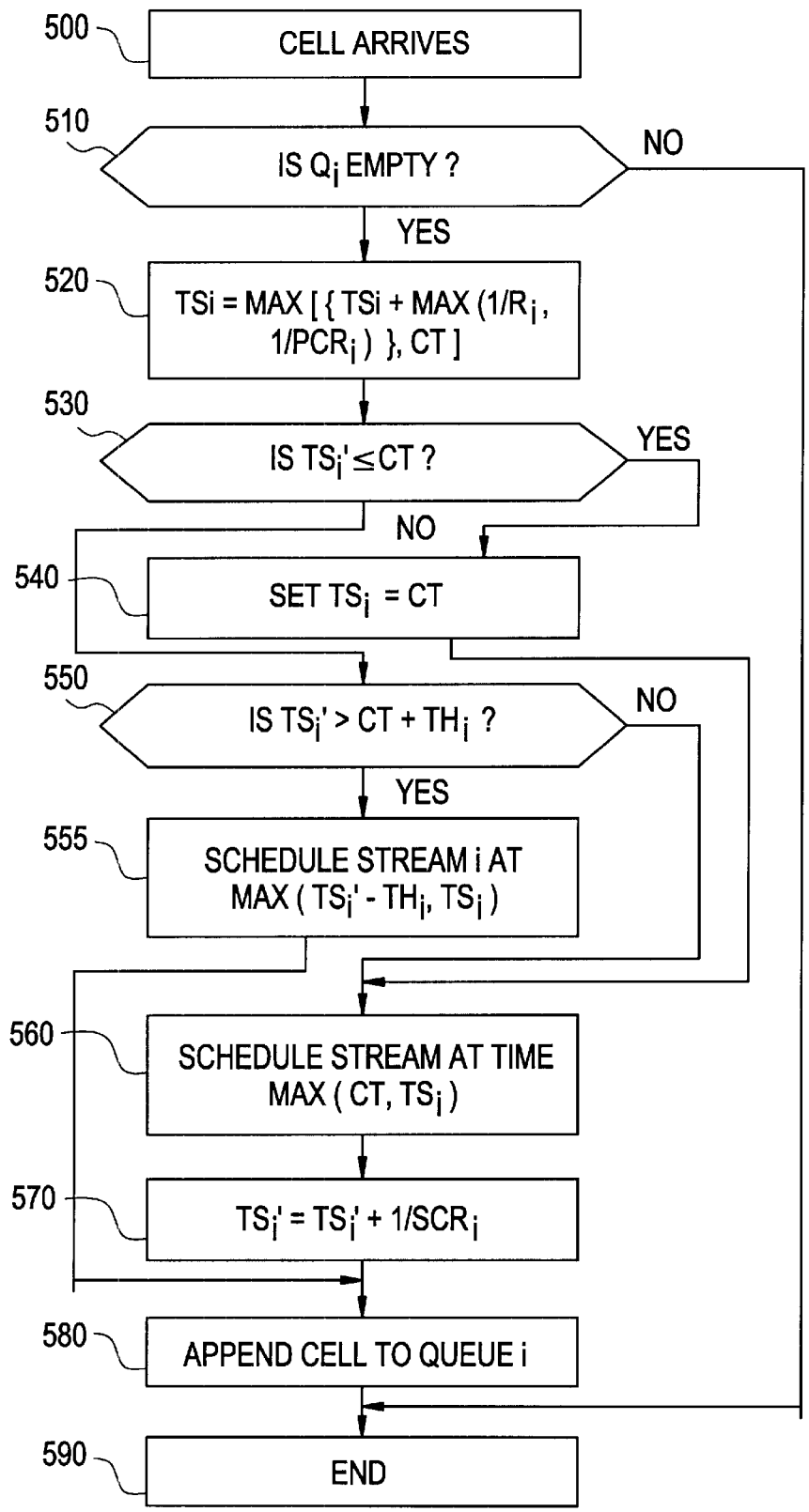
FIG. 17 shows the procedure for cell arrival timestamp computation combining scheduling and UPC shaping.

The purpose of shaping a stream is to force it to conform to UPC parameters which are policed at the next hop in the network (e.g., the interface to a separate subnetwork). This prevents cell discard or cell tagging incurred by the policer on nonconforming cells. FIG. 17 shows the procedure for computing the timestamp (not accounting for wrap-around) for combined rate scheduling and UPC shaping when a cell arrives to the stream i queue. After a cell arrives to queue i (step 500), the status of the queue is checked (step 510). If the queue is empty, the scheduling timestamp $TS_i$ is updated according to $TS_i=MAX[\{TS_i+MAX(1/PCR_i, 1/R_i)\}, CT]$ (step 520).

Then the shaping timestamp $TS_i'$ is compared with CT (step 530). If $TS_i'$ is less than or equal to CT, $TS_i'$ is set to CT (step 540). The stream is scheduled at time MAX(CT, $TS_i$) (step 560), $TS_i'$ is updated according to $TS_i'=TS_i'+1/SCR_i$ (step 570) and the cell is appended to queue i (step 580).

In step (530), if $TS_i'$ is greater than CT, then $TS_i'$ is compared with CT+TH$_i$ (step 550). If $TS_i'>CT+TH_i$, the stream is scheduled at time MAX($TS_i'-TH_i$, $TS_i$) (step 555). Then the cell is appended to queue i.

In step (550), if $TS_i'$ is less than or equal to CT+TH$_i$, the stream is scheduled at time MAX(CT, $TS_i$) (step 560), $TS_i'$ is updated according to $TS_i'=TS_i'+1/SCR_i$ (step 570) and then the cell is appended to queue i (step 580).

Figure 18:
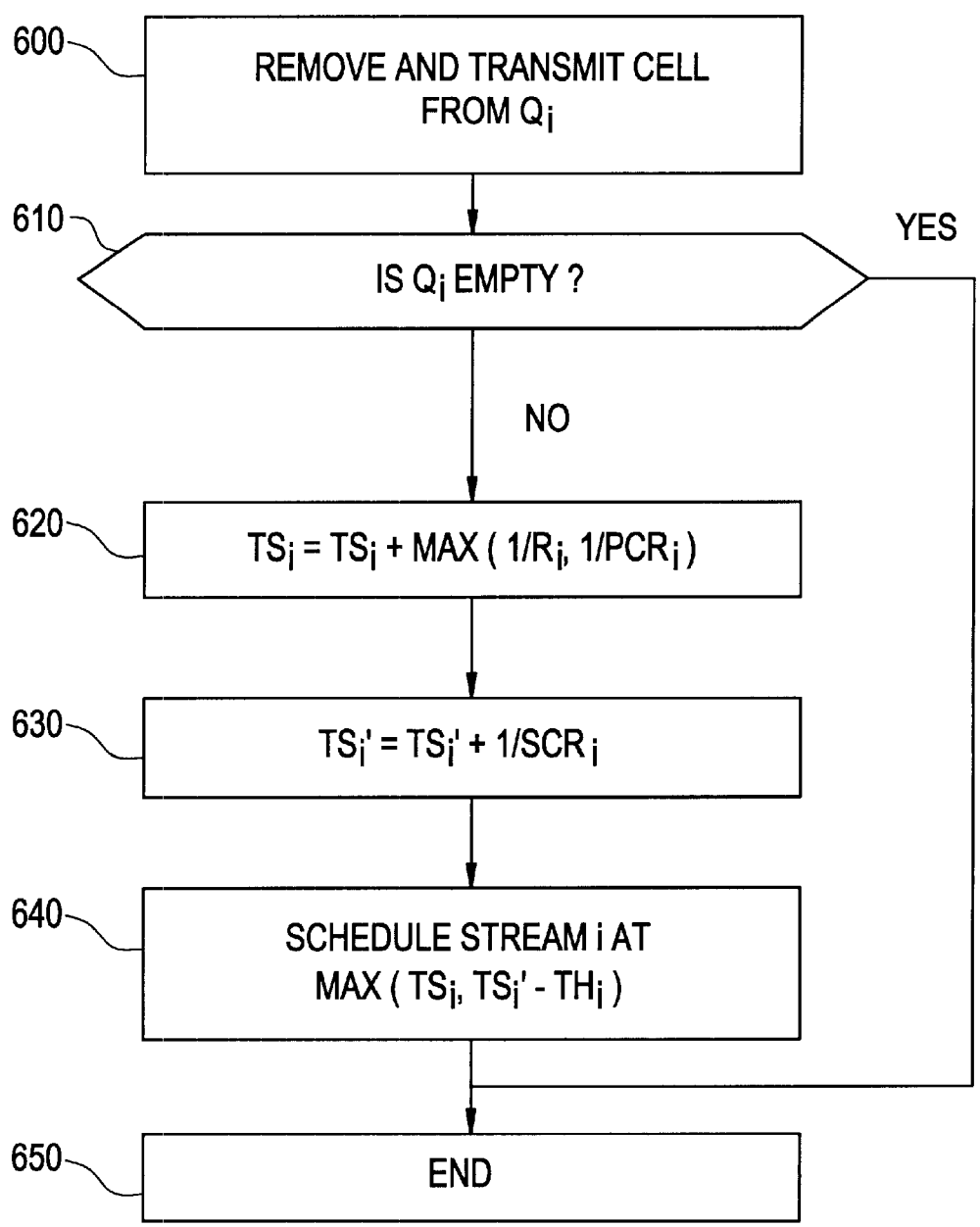
FIG. 18 shows the procedure for cell departure timestamp computation combining scheduling and UPC shaping.

FIG. 18 shows the procedure for computing the timestamp (not accounting for wrap-around) for combined rate scheduling and UPC shaping when a cell departs from a stream i queue. The cell is removed and transmitted from queue i (step 600). The status of the queue i is checked (step 610). If the queue is empty, the procedure ends (step 650). Otherwise, the scheduling timestamp is updated according to $TS_i=TS_i+MAX(1/R_i, 1/PCR_i)$ (step 620). The shaping timestamp is updated according to $TS_i'=TS_i'+1/SCR_i$ (step 630). Then the stream is scheduled at time MAX($TS_i$, $TS_i'-TH_i$) (step 640), before the procedure ends (step 650).

The present invention is a scalable and flexible architecture for implementing DRC scheduling in an ATM switch. The architecture performs peak rate shaping of streams, where the shaping rates are determined according to the DRC scheme. The scheduler is based on a timewheel data structure where stream queues await service until their computed timestamps expire. A ready list stores eligible stream queues which have not yet been served.

To achieve a wide range of rates without employing large memories, the scheduler is implemented with at least two timewheels: a fine grain timewheel and a coarse grain timewheel.

The timewheel structure is augmented with a plurality of priority levels, four in this example. The high priority level is assigned dynamically to ensure that streams will be able to meet their minimum rate guarantees. The remaining priority levels provide QoS differentiation at a coarse level. The timestamp value for each stream queue is updated, as appropriate, to achieve peak rate shaping in accordance with the rate determined by the DRC scheme.

While the above is a description of the invention in its preferred embodiments, various modifications and equivalents may be employed. Therefore, the above description and illustration should not be taken as limiting the scope of the invention which is defined by the claims.

What is claimed is:

1. An apparatus for scheduling stream queues serving cells in an ATM switch comprising:

a cell memory connected to a queue manager unit that stores ATM cells organized into stream queues; and a control memory connected to a scheduler unit and the queue manager that stores queue information;

wherein the scheduler unit selects a stream queue to be serviced, based on the queue information in the control memory, and comprises a timewheel scheduling memory that stores stream queue identifiers in a series of time-bins; and wherein the queue manager controls the receipt and transmission of ATM cells based on the congestion of the ATM switch and on the queue information in the control memory.

2. The apparatus of claim 1, wherein the scheduler unit further comprises:

a rate computation unit that computes the rate for each stream queue based on external rate information and the queue information in the control memory;

a time stamp computation unit that calculates a time stamp value for each stream queue;

at least one ready list that stores the stream queue identifiers that are ready to be serviced;

a scheduler logic unit that coordinates the operation of the timewheel scheduling memory, the time stamp computation unit and the ready list.

3. The apparatus of claim 1, wherein the scheduler unit comprises a plurality of timewheel scheduling memories, wherein time-bins in a first timewheel scheduling memory are assigned values corresponding to one cell time and time-bins in the other timewheel scheduling memories are assigned different values corresponding to more than one cell time.

4. The apparatus of claim 3, wherein the scheduler unit further comprises:
- a rate computation unit that computes the rate for each stream queue based on external rate information and then queue information in the control memory;
- a time stamp computation unit that calculates a time stamp for each stream queue;
- a ready list that stores the stream queue identifiers that are ready to be serviced;
- a scheduler logic unit that coordinates the operation of the plurality of timewheel scheduling memories, the time stamp computation unit and the ready list.

5. The apparatus of claim 4,
wherein each time-bin consists of a plurality of lists, each list corresponding to a different priority level, and
wherein there are a plurality of ready lists, each ready list corresponding to one of the different priority levels.

6. The apparatus of claim 4,
wherein each time-bin consists of a single list, and
wherein there are a plurality of ready lists, each ready list corresponding to a different priority level.

7. A method for scheduling stream queues containing cells in an ATM switch comprising the steps of:
(a) calculating a scheduling rate value for each stream;
(b) calculating a timestamp value for each stream queue based on its scheduling rate value;
(c) scheduling each stream queue by assigning a stream queue identifier to a first timewheel scheduling memory time-bin based on its timestamp value;
(d) transferring a list of stream queue identifiers from a time-bin on the timewheel to a ready list when a current time value equals the time-bin value;
(e) choosing a first stream queue identifier from the ready list; and
(f) transmitting a first cell in the stream queue corresponding to the chosen stream queue identifier;
wherein the timestamp value and current time value cycle.

8. The method of claim 7, wherein the timestamp value of each stream queue is recalculated at the occurrence of one of at least a cell arriving at an empty stream queue and a cell departing from a non- empty stream queue.

9. The method of claim 7, wherein the current time value never falls behind the timestamp value by more than one cycle or moves ahead of the timestamp value by more than one cycle.

10. The method of claim 7, wherein in step (c), each stream queue identifier is assigned to one of a plurality of timewheel scheduling memories at a time-bin based on its timestamp value.

11. A method for scheduling stream queues containing cells in an ATM switch comprising the steps of:
(a) calculating a scheduling rate value for each stream;
(b) calculating a timestamp value for each stream queue based on its scheduling rate value;
(c) assigning one of at least two priority levels to each stream queue, wherein the priority levels are assigned different values from high to low;
(d) scheduling each stream queue by assigning a stream queue identifier to a timewheel scheduling memory time-bin based on its timestamp value and its priority level;
(e) at each priority level, transferring a list of stream queue identifiers from a time-bin on the timewheel to a ready list when a current time value equals the time-bin value;
(f) choosing a first stream queue identifier from the highest priority non-empty ready list; and
(g) transmitting a first cell in the stream queue corresponding to the chosen stream queue identifier;
wherein the timestamp value and current time value cycle.

12. The method of claim 11, wherein a new stream queue identifier is placed on the time-bin corresponding to the timestamp value and on a list in the time-bin corresponding to the priority level.

13. The method of claim 11, wherein the time-bins are assigned priorities cyclically in priority level order and a new stream queue identifier is placed on the time-bin corresponding to the timestamp value and the priority level.

14. The method of claim 11, wherein the timestamp value of each stream queue is recalculated at the occurrence of one of at least a cell arriving at an empty stream queue and a cell departing from a non-empty stream queue.

15. The method of claim 11, wherein the current time value never falls behind the timestamp value by more than one cycle or moves ahead of the timestamp value by more than one cycle.

16. The method of claim 11, wherein in step (d) each stream queue identifier is assigned to a time-bin in one of a plurality of timewheel scheduling memories based on its timestamp value.

17. The method of claim 14, wherein the scheduling rate value computed for each stream is the minimum of a locally computed rate and an external rate.

18. The method of claim 14, wherein,
the timestamp calculation is augmented to perform both scheduling of the stream based on the scheduling rate value and
shaping the stream in conformance with usage parameter control policing parameters.

19. A method of scheduling a stream composed of a sequence of cells to successively transmit each cell towards a downstream side, comprising the steps of:
calculating, on the basis of a dynamic rate on the downstream side, a scheduling timestamp representative of timing at which each cell of the stream is to be scheduled; and
deciding a shaping timestamp of each cell on the basis of the scheduling timestamp
wherein the calculating step comprises the step of:
calculating the scheduling timestamp with reference to UPC (Usage Parameter Control) parameters.

20. A method of scheduling a stream composed of a sequence of cells to successively transmit each cell towards a downstream side, comprising the steps of:
calculating a scheduling timestamp on the basis of a peak cell rate (PCR) of the stream, a sustainable cell rate (SCR), a burst threshold (TH), and a dynamic rate; and
controlling a cell rate without congestion on the basis of the scheduling timestamp calculated
wherein the calculating step comprises the step of:
calculating the scheduling timestamp with reference to UPC (Usage Parameter Control) parameters.

21. A scheduler for use in scheduling a stream composed of a sequence of cells to successively transmit each cell towards a downstream side, comprising:
calculating means for calculating a scheduling timestamp with reference to a dynamic rate computed on congestion on the downstream side to specify scheduling time at which each cell of the stream is to be scheduled; and deciding means for deciding output timing of each cell in the shaped manner on the basis of the scheduling timestamp and the current time wherein the calculating means calculates the scheduling timestamp with reference to a peak cell rate (PCR) of the stream along with the dynamic rate.

22. A scheduler as claimed in claim 21, wherein the calculating means calculates the scheduling timestamp with reference to a sustainable cell rate (SCR) and a burst threshold (TH) for the stream together with the peak cell rate and the dynamic rate.

23. A scheduler for use in scheduling a stream composed of a sequence of cells to successively transmit each cell towards a downstream side, comprising:

calculating means for calculating a scheduling timestamp with reference to a dynamic rate computed on congestion on the downstream side to specify scheduling time at which each cell of the stream is to be scheduled; and deciding means for deciding output timing of each cell in the shaped manner on the basis of the scheduling timestamp and the current time wherein the calculating means comprises:
 first means for calculating, on arrival of each cell in the stream, a first timestamp of each cell on the basis of the dynamic rate of the stream, a peak cell rate (PCR) of the stream, and a current time.

24. A scheduler as claimed in claim 23, wherein the calculating means further comprises:

second means for calculating a second timestamp with reference to a sustainable cell rate (SCR) together with the first means for calculating the first timestamp.

25. A scheduler as claimed in claim 24, wherein the second means calculates the second timestamp also with reference to a predetermined burst threshold (TH) for the SCR.

26. A scheduler as claimed in claim 25, wherein the deciding means deciding the shaping timestamp from the first and the second timestamps.

27. A scheduler for use in scheduling a stream composed of a sequence of cells to successively transmit each cell towards a downstream side, comprising:

calculating means for calculating a scheduling timestamp with reference to a dynamic rate computed on congestion on the downstream side to specify scheduling time at which each cell of the stream is to be scheduled; and deciding means for deciding output timing of each cell in the shaped manner on the basis of the scheduling timestamp and the current time wherein the deciding means is operable to decide the shaping timestamp on cell departure; and the calculating means comprises:
 first means for calculating a first timestamp on the basis of a timestamp assigned to a preceding one of the cells in the stream, the dynamic rate of the stream, and a peak cell rate (PCR) of the stream, to obtain the scheduling timestamp with reference to the first timestamp.

28. A scheduler as claimed in claim 27, wherein the calculating means further comprises:

second means for calculating a second timestamp with reference to a sustainable cell rate (SCR) and a burst threshold (TH) to obtain the scheduling timestamp.

29. A scheduler as claimed in claim 28, wherein the calculating means comprises:

means for calculating the scheduling timestamp from the first and the second timestamps.

30. A scheduler as claimed in claim 29, wherein the second means comprises:

comparing means for comparing the first timestamp with a resultant timestamp obtained by subtracting a threshold from the second timestamp to assign a maximum one of the first timestamp and the resultant timestamp as the scheduling timestamp.

* * * * *

UNITED STATES PATENT AND TRADEMARK OFFICE
CERTIFICATE OF CORRECTION

PATENT NO.    : 6,389,019 B1
DATED         : May 14, 2002
INVENTOR(S)   : Ruixue Fan, Brian L. Mark, Gopalakrishan Ramamurthy and Alexander T. Ishii It is certified that error appears in the above-identified patent and that said Letters Patent is hereby corrected as shown below:

Column 2,
Line 57, delete "Vol. Oct. 31" insert -- Vol. 31, Oct, --

Column 7,
Lines 28 & 29, delete "times-tamp" insert -- timestamp --;

Column 8,
Line 50, delete "<CT" insert -- ≤CT --

Column 9,
Line 3, delete "<CT" insert -- ≤CT --

Column 12,
Line 66, delete "$Ts_I$" insert -- $TS_I$ --

Signed and Sealed this

Twenty-second Day of October, 2002

Attest:

Attesting Officer

JAMES E. ROGAN
*Director of the United States Patent and Trademark Office*